(12) United States Patent
Shin et al.

(10) Patent No.: US 10,425,033 B2
(45) Date of Patent: Sep. 24, 2019

(54) MOTOR DRIVING APPARATUS AND METHOD OF CONTROLLING THE SAME

(71) Applicant: SAMSUNG ELECTRONICS CO., LTD., Suwon-si, Gyeonggi-do (KR)

(72) Inventors: Jong Hyun Shin, Seoul (KR); Sun Jin Kim, Suwon-si (KR); Jin Han Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/542,540

(22) PCT Filed: Jan. 4, 2016

(86) PCT No.: PCT/KR2016/000008
§ 371 (c)(1),
(2) Date: Jul. 10, 2017

(87) PCT Pub. No.: WO2016/111508
PCT Pub. Date: Jul. 14, 2016

(65) Prior Publication Data
US 2017/0373629 A1    Dec. 28, 2017

(30) Foreign Application Priority Data

Jan. 8, 2015  (KR) .................. 10-2015-0002753

(51) Int. Cl.
*H02P 21/24* (2016.01)
*H02P 27/08* (2006.01)
(Continued)

(52) U.S. Cl.
CPC .......... *H02P 27/08* (2013.01); *H02P 21/0025* (2013.01); *H02P 21/16* (2016.02);
(Continued)

(58) Field of Classification Search
CPC ...... H02P 21/0025; H02P 21/16; H02P 21/20; H02P 21/22; H02P 27/06; H02P 27/08; H02P 29/60; H02P 29/67
See application file for complete search history.

(56) References Cited

U.S. PATENT DOCUMENTS

| | | | |
|---|---|---|---|
| 2002/0113615 A1* | 8/2002 | Atarashi | B60L 11/1803 318/400.01 |
| 2007/0200528 A1* | 8/2007 | Itou | H02P 21/02 318/719 |

(Continued)

FOREIGN PATENT DOCUMENTS

| | | |
|---|---|---|
| CN | 101154911 | 4/2008 |
| EP | 0358111 | 3/1990 |

(Continued)

OTHER PUBLICATIONS

Lemmens et al. "Dynamic DC-link Voltage Adaptation for Thermal Management of Traction Drives", IEEE, 2013, pp. 180-187.

(Continued)

*Primary Examiner* — Muhammad S Islam
(74) *Attorney, Agent, or Firm* — Staas & Halsey LLP

(57) ABSTRACT

It is an aspect of the present disclosure to provide a motor driving apparatus, and a method of controlling the same. In accordance with one aspect of the present disclosure, the motor driving apparatus includes an inverter configured to supply driving power to a motor; a sensing unit configured to sense a DC voltage supplied to the inverter and a driving current supplied from the inverter to the motor; and a controller configured to compensate for an iron loss and a copper loss by calculating a loss of the motor based on the sensed DC voltage and driving current and controlling the inverter to adjust the driving current based on the calculated loss of the motor.

16 Claims, 30 Drawing Sheets

(51) Int. Cl.
*H02P 21/22* (2016.01)
*H02P 21/00* (2016.01)
*H02P 21/16* (2016.01)
*H02P 21/20* (2016.01)
*H02P 29/60* (2016.01)

(52) U.S. Cl.
CPC .............. *H02P 21/20* (2016.02); *H02P 21/22* (2016.02); *H02P 29/60* (2016.02); *H02P 29/67* (2016.11)

(56) References Cited

U.S. PATENT DOCUMENTS

| | | | |
|---|---|---|---|
| 2010/0052583 A1* | 3/2010 | Takamatsu | B60L 11/18 318/400.09 |
| 2012/0146683 A1* | 6/2012 | Tanimoto | B60L 3/0061 324/765.01 |
| 2014/0125258 A1 | 5/2014 | Fulton | |

FOREIGN PATENT DOCUMENTS

| | | |
|---|---|---|
| EP | 2 713 502 A1 | 4/2014 |
| JP | 2002-199776 | 7/2002 |
| JP | 2002-252995 | 9/2002 |
| JP | 2009-278691 | 11/2009 |
| JP | 2015-2671 | 1/2015 |
| KR | 10-2009-0049854 | 5/2009 |
| WO | WO 2005/093942 A1 | 10/2005 |

OTHER PUBLICATIONS

European Office Action dated Dec. 19, 2017, in corresponding European Patent Application No. 16 735 129.5.
European Search Report dated Dec. 1, 2017, in n corresponding European Patent Application No. 16735129.5.
International Search Report dated Apr. 29, 2016, in corresponding International Patent Application No. PCT/KR2016/000008.
International Written Opinion, PCT/ISA/237, dated Apr. 29, 2016, in corresponding International Patent Application No. PCT/KR2016/000008.
European Communication dated Aug. 14, 2018 in European Patent Application No. 16735129.5.
European Communication dated May 2, 2019 in European Patent Application No. 16735129.5.
Chinese Office Action dated Jun. 27, 2019 in Chinese Patent Application No. 201680005349.1.

* cited by examiner

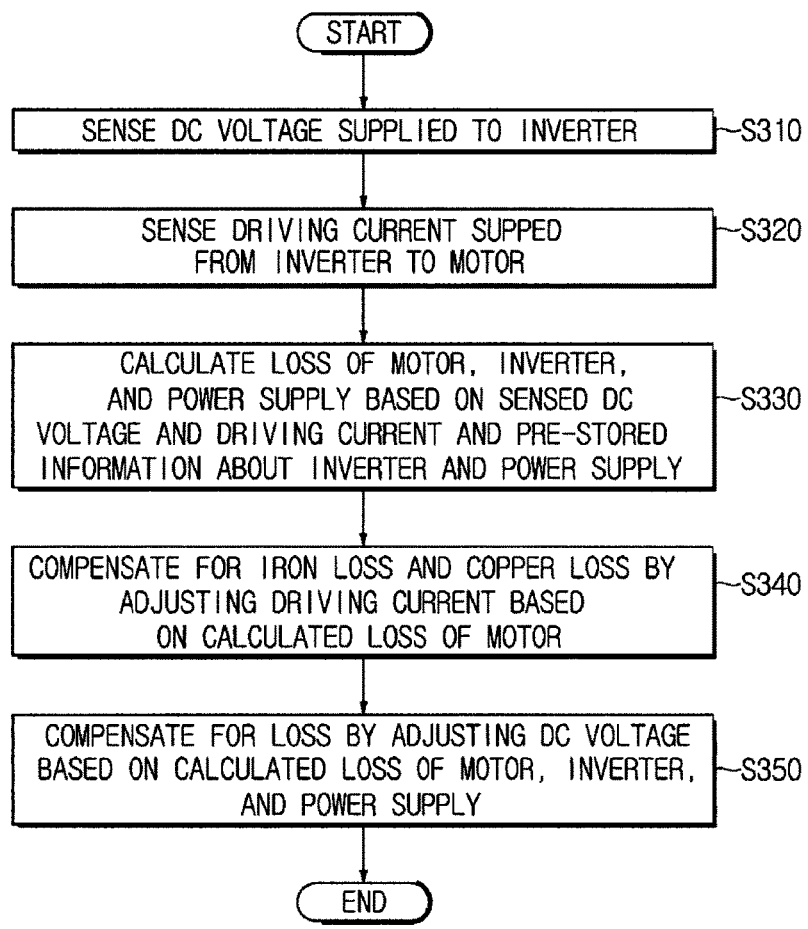

MOTOR DRIVING APPARATUS AND METHOD OF CONTROLLING THE SAME

CROSS-REFERENCE TO RELATED APPLICATIONS

This application is a U.S. National Stage Application which claims the benefit under 35 U.S.C. § 371 of PCT International Patent Application No PCT/KR2016/000008, filed Jan. 4, 2016, which claims the foreign priority benefit under 35 U.S.C. § 119 of Korean Patent Application No. 10-2015-0002753, filed Jan. 8, 2015, the contents of which are incorporated herein by reference.

TECHNICAL FIELD

The present disclosure relates to a motor driving apparatus to compensate for losses occurring while a motor is driven and a method of controlling the same.

BACKGROUND ART

A motor is a machine designed to obtain a rotational force from electric energy and may include a stator and a rotor. The rotor is configured to electromagnetically interact with the stator and may rotate by a force acting between a magnetic field and a current flowing in coils.

In a motor, a copper loss that is a current loss consumed during conversion of electric energy into mechanical energy, an iron loss that is a magnetic flux loss consumed during rotation of the motor, and a loss by a power conversion unit such as a power supply and an inverter occur. Although maximum torque per ampere (MTPA) control methods have been widely used conventionally, only the copper loss is compensated for thereby. Thus, recently, extensive research has been conducted into methods of compensating for the copper loss, iron loss, and loss of the power conversion unit.

DETAILED DESCRIPTION OF THE INVENTION

Technical Problem

An aspect of the present disclosure is to provide a motor driving apparatus configured to adjust a driving current to compensate for a copper loss and an iron loss and adjust a direct current (DC) voltage to compensate for losses of an inverter and a power supply, and a method of controlling the same.

Technical Solution

In accordance with one aspect of the present disclosure, a motor driving apparatus includes an inverter configured to supply driving power to a motor; a sensing unit configured to sense a DC voltage supplied to the inverter and a driving current supplied from the inverter to the motor; and a controller configured to compensate for an iron loss and a copper loss by calculating a loss of the motor based on the sensed DC voltage and driving current and controlling the inverter to adjust the driving current based on the calculated loss of the motor.

The controller may compensate for the iron loss and the copper loss by calculating a temperature, an inductance, a torque, and a rotational speed of the motor based on the sensed DC voltage and driving current and controlling the inverter to adjust the driving current based on the calculated temperature, inductance, torque and rotational speed.

The controller may control the inverter to adjust the driving current based on an inverter command calculating formula.

The controller may control the inverter to adjust the driving current based on an inverter command data table.

The sensing unit may sense a rotational displacement of the motor, and the controller may calculate the rotational speed based on the sensed rotational displacement.

The controller may calculate a phase resistance to calculate a temperature of the motor and calculates the temperature based on the calculated phase resistance.

The controller may calculate a counter-electromotive force constant to calculate a temperature of the motor and calculates the temperature based on the calculated counter-electromotive force constant.

The sensing unit may sense a temperature of the motor, and the controller may do not calculate a temperature but uses the sensed temperature to control the inverter.

The controller may do not calculate the inductance but uses pre-stored parameters.

In accordance with another aspect of the present disclosure, a motor driving apparatus includes a power supply configured to supply DC power to the inverter; sensing unit configured to sense a DC voltage supplied to the inverter and a driving current supplied from the inverter to the motor; and a controller configured to compensate for losses of the inverter and the power supply by calculating losses of the motor, the inverter, and the power supply based on the sensed driving current and pre-stored information about the inverter and the power supply and controlling the power supply to adjust the DC voltage supplied to the inverter based on the calculates losses of the motor, the inverter, and the power supply.

The controller may compensate for the losses of the inverter and the power supply by calculating a torque and a rotational speed of the motor based on the sensed driving current and controlling the power supply to adjust the DC voltage based on the calculated torque and rotational speed of the motor and the losses of the inverter and the power supply.

The controller may control the power supply to adjust the DC voltage based on a power supply command calculating formula.

The controller may control the power supply to adjust the DC voltage based on a power supply command data table.

The sensing unit may sense a rotational displacement of the motor, and the controller may calculate the rotational speed based on the sensed rotational displacement.

In accordance with another aspect of the present disclosure, a motor driving apparatus includes an inverter configured to supply driving power to a motor; a power supply configured to supply DC power to the inverter; a sensing unit configured to sense a DC voltage supplied to the inverter and a driving current supplied from the inverter to the motor; and a controller configured to calculate losses of the motor, the inverter, and the power supply based on the sensed DC voltage and driving current and pre-stored information about the inverter and the power supply, compensate for an iron loss and a copper loss by controlling the inverter to adjust the driving current based on the calculated loss of the motor, and compensate for the losses of the inverter and the power supply by controlling the power supply to adjust the DC voltage supplied to the inverter based on the calculated losses of the motor, the inverter, and the power supply.

In accordance with one aspect of the present disclosure, a method of controlling a motor driving apparatus, the method includes sensing a DC voltage supplied to an inverter and a driving current supplied from the inverter to a motor; calculating a loss of the motor based on the sensed DC voltage and driving current; and compensating for an iron loss and a copper loss by adjusting the driving current based on the calculated loss of the motor.

The method may further include calculating a temperature, an inverter, a torque, and a rotational speed of the motor based on the sensed DC voltage and driving current, the compensation for the iron loss and the copper loss may be performed by adjusting the driving current based on the calculated temperature, inductance, torque, and rotational speed.

The compensation for the iron loss and the copper loss may be performed by adjusting the driving current based on an inverter command calculating formula.

The compensation for the iron loss and the copper loss may be performed by adjusting the driving current based on an inverter command data table.

The method may further include sensing a rotational displacement of the motor, and the calculation of the rotational speed is performed based on the sensed rotational displacement.

The calculation of the temperature of the motor may be performed by calculating a phase resistance and calculating the temperature based on the calculated phase resistance.

The calculation of the temperature of the motor may be performed by calculating a counter-electromotive force constant and calculating the temperature based on the calculated counter-electromotive force constant.

The method may further include sensing a temperature of the motor, and the driving current may be adjusted by using the sensed temperature of the motor without calculating the temperature of the motor.

The inductance may be calculated using pre-stored parameters without using the sensed DC voltage and driving current.

In accordance with another aspect of the present disclosure, a method of controlling a motor driving apparatus, the method includes sensing a DC voltage supplied to an inverter and a driving current supplied from the inverter to a motor; calculating losses of the motor, the inverter, and the power supply based on the sensed driving current and pre-stored information about the inverter and the power supply; and compensating for the losses of the inverter and the power supply by adjusting the DC voltage supplied to the inverter based on the calculated losses of the motor, the inverter, and the power supply.

The method may further include calculating a torque and a rotational speed of the motor based on the sensed driving current, and the compensation for the losses of the inverter and the power supply may be performed by adjusting the DC voltage based on the calculated torque and rotational speed of the motor and the losses of the inverter and the power supply.

The compensation for the losses may be performed by adjusting the DC voltage based on a power supply command calculating formula.

The compensation for the losses may be performed by adjusting the DC voltage based on a power supply command data table.

The method may further include sensing a rotational displacement of the motor, and the calculation of the rotational speed may be performed based on the sensed rotational displacement.

In accordance with one aspect of the present disclosure, a method of controlling a motor driving apparatus, the method may include sensing a DC voltage supplied to an inverter and a driving current supplied from the inverter to a motor; calculating losses of the motor, the inverter, and the power supply based on the sensed DC voltage and driving current and pre-stored information about the inverter and the power supply; and compensating for an iron loss and a copper loss by adjusting the driving current based on the calculated loss of the motor; and compensating for the losses of the inverter and the power supply by adjusting the DC voltage supplied to the inverter based on the calculated losses of the motor, the inverter, and the power supply.

Advantageous Effects

According to the motor driving apparatus and the method of controlling the same, losses occurring in a motor may be reduced by adjusting a driving current to compensate for a copper loss and an iron loss and adjusting a DC voltage to compensate for losses of an inverter and a power supply.

BRIEF DESCRIPTION OF THE DRAWINGS

FIG. 30 is a flowchart illustrating a method of compensating for a loss of a motor driving apparatus according to another embodiment.

DETAILED DESCRIPTION OF THE EMBODIMENTS

Figure 1:
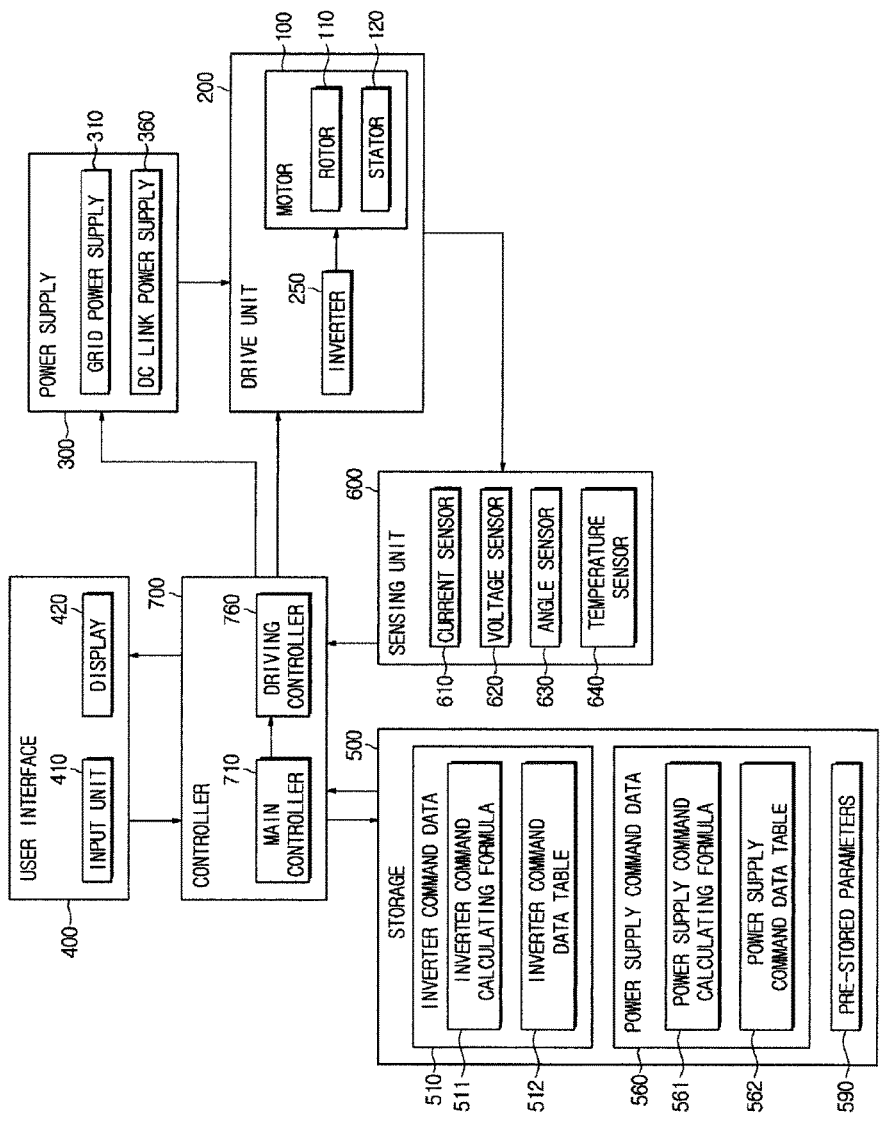
FIG. 1 is a block diagram illustrating the configuration of a motor driving apparatus.

Reference will now be made in detail to the embodiments of the present disclosure, examples of which are illustrated in the accompanying drawings, wherein like reference numerals refer to like elements throughout. In the following description of the embodiments of the present disclosure, a detailed description of known functions and configurations incorporated herein will be omitted when it may obscure the subject matter of the embodiments of the present disclosure.

The terms used in this specification are selected from currently widely used general terms in consideration of functions of the present disclosure, but may vary according to the intentions or practices of those skilled in the art or the advent of new technology. Additionally, in certain cases, there may be terms that an applicant may arbitrarily select, and in this case, their meanings are described below. Accordingly, the terms used in this specification should be interpreted on the basis of substantial implications that the terms have and the contents across this specification not the simple names of the terms.

Although aspects and embodiments of the present invention are illustrated as a single integrated configuration in the drawings, the respective aspects and embodiments may be freely combined with each other as long as features thereof are not contradictory to each other.

Hereinafter, a motor driving apparatus and a method of controlling the motor driving apparatus according to exemplary embodiments of the present disclosure will be described with reference to the accompanying drawings.

Hereinafter, a motor driving apparatus according to an exemplary embodiment will be described with reference to FIGS. 1 and 2.

FIG. 1 is a block diagram illustrating the configuration of a motor driving apparatus.

A motor driving apparatus 1 may include a drive unit 200, a power supply 300, a sensing unit 600, a storage 500, a user interface 400, and a controller 700 as illustrated in FIG. 1.

The drive unit 200 is a device configured to receive a control signal of the controller 700 and generate a driving force of a motor 100. Also, the drive unit 200 may include an inverter 250 and the motor 100.

The inverter 250 is a device configured to supply converted power to the motor 100 based on the control signal of the controller 700. Detailed descriptions of the inverter 250 will be given below with reference to FIG. 4.

The motor 100 is a device configured to convert power received from the inverter 250 and the power supply 300 into mechanical energy and generate a rotational force. The motor 100 may include a motor housing, a stator 120, a shaft, and a rotor 110, The motor housing defines an appearance of the motor 100 and is coupled to fixing protrusions of the stator 120 to provide a fixing force to prevent the stator 120 from rotating.

The stator 120 may include a stator core, teeth, and coils.

The stator core constitutes a frame of the stator 120 to maintain the shape of the stator 120 and provides a passage for formation of a magnetic field such that a first tooth magnetized by electric power inductively magnetizes a second tooth adjacent thereto to a pole opposite to that of the first tooth.

In addition, the stator core may have a cylindrical shape and may be formed by laminating press-processed steel plates. A plurality of teeth may be disposed in the circumferential direction on the inner side of the stator core, and a plurality of fixing protrusions may be disposed in the circumferential direction on the outer side of the state core. Besides, the state core may have various other shapes so long as the shape of the stator 120 is maintained and the teeth and fixing protrusions are disposed therein.

A plurality of teeth is disposed inside of the stator core in partitioned sections, and an inner space of the stator core may be partitioned along the circumferential direction by a plurality of slots. In addition, the teeth may provide a space where coils are located and may be magnetized to a north (N) pole or a south (S) pole by a magnetic field generated by electric currents supplied to the coils.

Also, the tooth may have a Y-shape. Surfaces adjacent to the rotor 10 among outer surfaces of the teeth may be curved to efficiently generate both attractive and repulsive forces with a magnetic flux concentration core of the rotor 10. In addition, the teeth may also have various other structures to provide a space for the coils and efficiently generate attractive and repulsive forces with the magnetic flux concentration core.

The coils may be disposed on insulators located on the teeth of the stator 120 to generate the magnetic field by electric power applied thereto. Thus, the coils may magnetize the teeth located in the respective coils.

In addition, motors may be run on three-phase power or single-phase power.

Besides, various combinations of coils may also be used to control rotation of the rotor 110 and to allow attractive and repulsive forces to efficiently act between magnetic fields of the rotor 110 and the stator 120.

Methods of winding the coils may be classified into concentrated winding and distributed winding. In case of the concentrated winding, all the coils of one phase are concentrated in the same slot under one pole. In case of the distributed winding, coils are introduced to at least two slots covering multiple tooth poles. Besides, any other methods of winding coils may also be used to efficiently magnetize teeth.

Finally, materials used to form the coils may be copper, aluminum, or any composite material of copper and aluminum. In addition, various other materials may also be used to manufacture coils to efficiently magnetize the teeth.

The shaft may be connected to a shaft insertion hole of the rotor 110 to rotate together with the rotor 110.

The rotor 110 is a device to acquire a rotational force of the motor 100 using attractive and repulsive forces acting between a magnetic field generated by a permanent magnet and a magnetic field generated by teeth of the stator 120 and may be located inside the stator 120. The rotor 110 may include a rotor core and a permanent magnet.

The rotor 110 may include a rotor core configured to concentrate a passage of a magnetic field generated by permanent magnets and a magnetic flux thereof and prevent scattering the same and permanent magnets configured to generate the magnetic field.

The rotor core may include a main core, a radial core, a magnetic flux concentration core, an inner engaging portion, an inner magnetic flux leakage preventing portion, and an outer engaging portion.

The main core may constitute a frame of the rotor 110 to maintain the shape of the rotor 110 against a stress applied to the rotor 110 during rotation of the rotor 110. Also, the main core may provide a passage of the magnetic field generated by the permanent magnet such that the magnetic flux flows along the main core.

The radial core may be coupled to the main core to extend outwards in the radial direction to be perpendicular to the circumferential direction of the rotor 110. The radial core may provide a passage to allow the magnetic flux to flow through the magnetic field generated by a pair of permanent magnets adjacent to the radial core.

The magnetic flux concentration core induces the magnetic field to be generated at the magnetic flux concentration core by a pair of permanent magnets located at opposite sides of the magnetic flux concentration core to concentrate the magnetic flux.

The inner engaging portion reduces scattering of the magnetic flux concentration core caused by a centrifugal force generated outwards from the center of the rotor 110 during rotation of the rotor 110. Particularly, the inner engaging portion is located between an inner side of the magnetic flux concentration core and an outer side of the main core and coupled to the inner side of the magnetic flux concentration core and the outer side of the main core respectively. Thus, the inner engaging portion reduces outward displacement of the magnetic flux concentration core by the centrifugal force to reduce scattering of the magnetic flux concentration core.

The outer engaging portion reduces scatting of the magnetic flux concentration core, the radial core, and the permanent magnet caused by the centrifugal force generated outwards from the center of the rotor 110 during rotation of the rotor 110. Particularly, the outer engaging portion is located between the radial core and the magnetic flux concentration core and coupled to the radial core and the magnetic flux concentration core. Thus, the outer engaging portion reduces outward displacement of the magnetic flux concentration core, the radial core, and the permanent magnet caused by the centrifugal force to reduce scatting of the magnetic flux concentration core, the radial core, and the permanent magnet.

The above-described main core, radial core, magnetic flux concentration core, inner engaging portion, and outer engaging portion may be formed of soft magnetic materials and metals to provide a passage through which the magnetic flux flows and to have electric conductivity. In addition, various other materials that have electromagnetic conductivity and are not deformed by external stress may also be used to form the main core, the radial core, the magnetic flux concentration core, the inner engaging portion, and the outer engaging portion.

The permanent magnets may be disposed at opposite sides of the radial core and the magnetic flux concentration core to generate magnetic fields in the rotor core. In addition, the permanent magnets may be formed of a ferrite material. Although ferrite refers to a solid solution in which an alloy element or an impurity is dissolved in iron of a body-centered cubic crystal, ferrite may also refer to ceramic materials that are generally magnetic or applied to magnetic fields. In addition, various other materials may also be used to form the permanent magnet to allow attractive and repulsive forces to act between the magnetic field generated by the permanent magnets and the magnetic field generated by electric power applied to coils of the stator 120.

Although the motor 100 has been described based on an interior permanent magnet (IPM) spoke-type motor, the embodiments are not limited to the IPM spoke-type motor. For example, the motor 100 may be a surface mount type motor or a V-type motor. Also, the motor 100 may be a permanent magnet-type motor or an induction-type motor. In addition, the rotor 110 of the motor 100 may be a salient pole-type or the rotor 110 may be located along the outer circumferential area of the stator 120 instead of the inner circumferential area thereof.

The power supply 300 may include a Grid power supply 310 and a direct current (DC) Link power supply 360. The Grid power supply 310 is a power supply unit configured to provide alternating current (AC) power to the DC Link power supply 360, or the like. The Grid power supply 310 may receive electric power from the outside and transmit the electric power to the DC Link power supply 360 or convert chemical energy of a battery, or the like into electric energy and transmit the converted energy to the DC Link power supply 360.

The DC Link power supply 360 converts AC power received from the Grid power supply 310 into DC power and provide electric energy required to drive the inverter 250.

The sensing unit 600 may include a current sensor 610 configured to sense a driving current supplied to the coils, a voltage sensor 620 configured to sense a DC voltage transmitted to the inverter 250, an angle sensor 630 configured to sense a rotational displacement of the rotor 110, and a temperature sensor 640 configured to sense a temperature of the motor 100.

The current sensor 610 may detect a driving current value flowing in three input terminals of the motor 100 and the voltage sensor 620 may sense a DC voltage supplied to an input terminal of the inverter 250. The current sensor 610 and the voltage sensor 620 will be described in more detail below with reference to FIG. 2.

The angle sensor 630 is disposed at one side of the stator 120 to detect a rotational displacement of the rotor 110. In addition, the angle sensor 630 may provide the controller 700 with a rotational angle of the rotor 110 sensed by the angle sensor 630.

Particularly, the angle sensor 630 uses an N-type semiconductor and may express a magnetic field using a voltage by the Hall Effect. Thus, the angle sensor 630 may output an angle, a frequency, a drive time, and the like related to the rotational displacement of the rotor 110 by sensing sense changes in the magnetic field caused by rotation of the rotor 110.

The rotational displacement of the rotor 110 may also be detected by using any other angle sensors such as a resolver, a potentiometer, an absolute encoder, and an incremental encoder as well as a hall sensor described above.

Particularly, the resolver that is a rotary electrical transformer is an analog angle sensor configured to output an AC voltage proportional to a position of the rotor 110 in a state of being connected to the shaft of the motor 100. The potentiometer is an angle sensor configured to calculate an electrical input directly proportional to an angle of rotation by varying a variable resistance in accordance with angle. The absolute encoder is an angle sensor configured to detect the degree of rotation using optical pulse waves without setting a reference position. The incremental encoder is an angle sensor to calculate an angle by increasing and decreasing a measured angle after setting a reference position to detect the degree of rotation by using optical pulse waves.

In addition, various other sensors measuring angles and frequencies may also be used as the angle sensor 630.

In addition, although one angle sensor 630 may be used, two, three, or more angle sensors may also be provided. The number of the angle sensors 630 may be determined in consideration of unit price of the motor driving apparatus 1, an error range of the rotational displacement to be sensed, and the like.

The temperature sensor 640 senses a temperature of the motor 100. Particularly, the temperature sensor 640 may sense a temperature of the motor 100 increasing due to an increase in driving current supplied to the motor 100 or an increase in rotational speed or load of the motor 100.

The temperature sensor 640 will be described in more detail below with reference to FIGS. 24 and 25.

The storage 500 is a device configured to store data about the rotational displacement of the motor 100 sensed by the sensing unit 600 and a voltage command transmitted to the inverter 250, control data of the controller 700, input data of the input unit 410, communication data of a communication unit, and the like.

The storage 500 may also store inverter command data 510, power supply command data 560, and pre-stored parameters 590.

The inverter command data 510 is data used to compensate for a copper loss and an iron loss that are losses of the motor 100 and required to generate a compensation value or a command corresponding to temperature (or phase resistance), an inductance, a torque, and a rotational speed of the motor 100. The inverter command data 510 may include an inverter command calculating formula 511 and an inverter command data table 512.

The inverter command calculating formula 511 is a formula to calculate a command using a temperature (or phase resistance), an inductance, a torque and a rotational speed of the motor 100 as input variables. The calculated command controls a driving current generated by the inverter 250. The inverter command calculating formula 511 may include a formula in consideration of losses of the motor 100, i.e., a copper loss as a current loss and an iron loss as a magnetic flux loss.

The inverter command data table 512 refers to data in which a plurality of commands respectively corresponding to a plurality of discontinuous variables of the temperature (or phase resistance), the inductance, the torque, and the rotational speed of the motor 100 arranged in a look-up-table form. The inverter command data table 512 may include experimentally calculated values to minimize the loss of the motor based on experiments while the motor driving apparatus 1 is manufactured or designed.

The power supply command data 560 is data used to compensate for the loss of the power conversion unit such as the power supply 300 and the inverter 250 and required to generate a compensation value or command corresponding to the torque and the rotational speed of the motor 100 and the loss of the power conversion unit. The power supply command data 560 may include a power supply command calculating formula 561 and a power supply command data table 562.

In this regard, the power conversion unit refers to an element configured to convert input power from one form to another to supply the driving power to the motor 100 such as the power supply 300 and the inverter 250.

The power supply command calculating formula 561 is a formula to calculate a command using a torque and a rotational speed of the motor 100 and a loss of the power conversion unit as input variables. The calculated command controls a DC voltage generated by the power supply 300. The power supply command calculating formula 561 is a formula in consideration of the loss of the motor 100 and the loss of the power conversion unit, i.e., a switching loss and a conduction loss of the power conversion unit.

The power supply command data table 562 refers to data in which a plurality of commands respectively corresponding to a plurality of discontinuous variables of the torque and the rotational speed of the motor 100 and the loss of the power conversion unit are arranged in a look-up-table form. The power supply command data table 562 includes experimentally calculated values to minimize the loss of the power conversion unit based on experiments while the motor driving apparatus 1 is manufactured or designed.

The pre-stored parameters 590 are a set of variables required to generate or control the driving current or the DC voltage. The pre-stored parameters 590 are variables that changes or have no or little changes and are arranged in a table and stored while the motor driving apparatus 1 is manufactured or designed among variables required to generate or control the driving current or the DC voltage. For example, the pre-stored parameters 590 may include data regarding a d-axis inductance, a q-axis inductance, a counter-electromotive force constant, an inertia of the motor 100, the number of poles of the motor 100, an intrinsic data sheet of the inverter 250, and an intrinsic data sheet of the power supply 300.

The storage 500 may include a non-volatile storage such as a read-only memory (ROM), a high-speed random access memory (RAM), a magnetic disk storage device, and a flash storage device, or any other non-volatile semiconductor storage devices.

For example, the storage 500 may be a semiconductor memory device such as a secure digital (SD) memory card, a secure digital high capacity (SDHC) memory card, a mini SD memory card, a mini SDHC memory card, a Trans Flash (TF) memory card, a micro SD memory card, a micro SDHC memory card, a memory stick, a Compact Flash (CF), a Multi-Media Card (MMC), a MMC micro, an Extreme Digital (XD) card, or the like.

Also, the storage 500 may include a network attached storage device with remote access capabilities via a network.

The user interface 400 is an element configured to allow a user to input a command to the motor driving apparatus 1 or to recognize operation of the motor driving apparatus 1. The user interface 400 may include an input unit 4 and a display 420.

The input unit 410 is a combination of a plurality of manipulation buttons to select the operation of the motor driving apparatus 1. The input unit 410 may be configured as a push-type to press the manipulation buttons, a slide-switch type to control the operation of the motor driving apparatus 1 desired by the user, or a touch-type to input the operation desired by the user. Besides, various other input devices to input the operation of the motor driving apparatus 1 desired by the user may also be used as the input unit 410.

The display 420 may display a control state of the motor driving apparatus 1 controlled by the controller 700, an operation state of the motor driving apparatus 1 sensed by the sensing unit 600, and the like to the user in visual, auditory, and tactile ways.

The controller 700 may include a main controller 710 configured to control the overall operation of the motor driving apparatus 1 and a driving controller 760 configured to control the operation of the drive unit 200.

In addition, the controller 700 may serve as a central processing unit (CPU), and the types of the CPU may be a microprocessor. The microprocessor refers to a processing device in which an arithmetic logic unit, a register, a program counter, a command decoder, a control circuit, and the like are disposed on at least one silicon chip.

In addition, the microprocessor may include a graphic processing unit (GPU) for graphic processing of images or videos. The microprocessor may be implemented as a system on chip (SoC) including a core and a GPU. The microprocessor may include a single core, a dual core, a triple core, a quad core, and multiples thereof.

In addition, the controller 700 may include a graphic processing board including a GPU, a RAM, or a ROM in a separate circuit board electrically connected to the microprocessor.

The controller 700 will be described in more detail below with reference to FIGS. 3 to 27.

Figure 2:
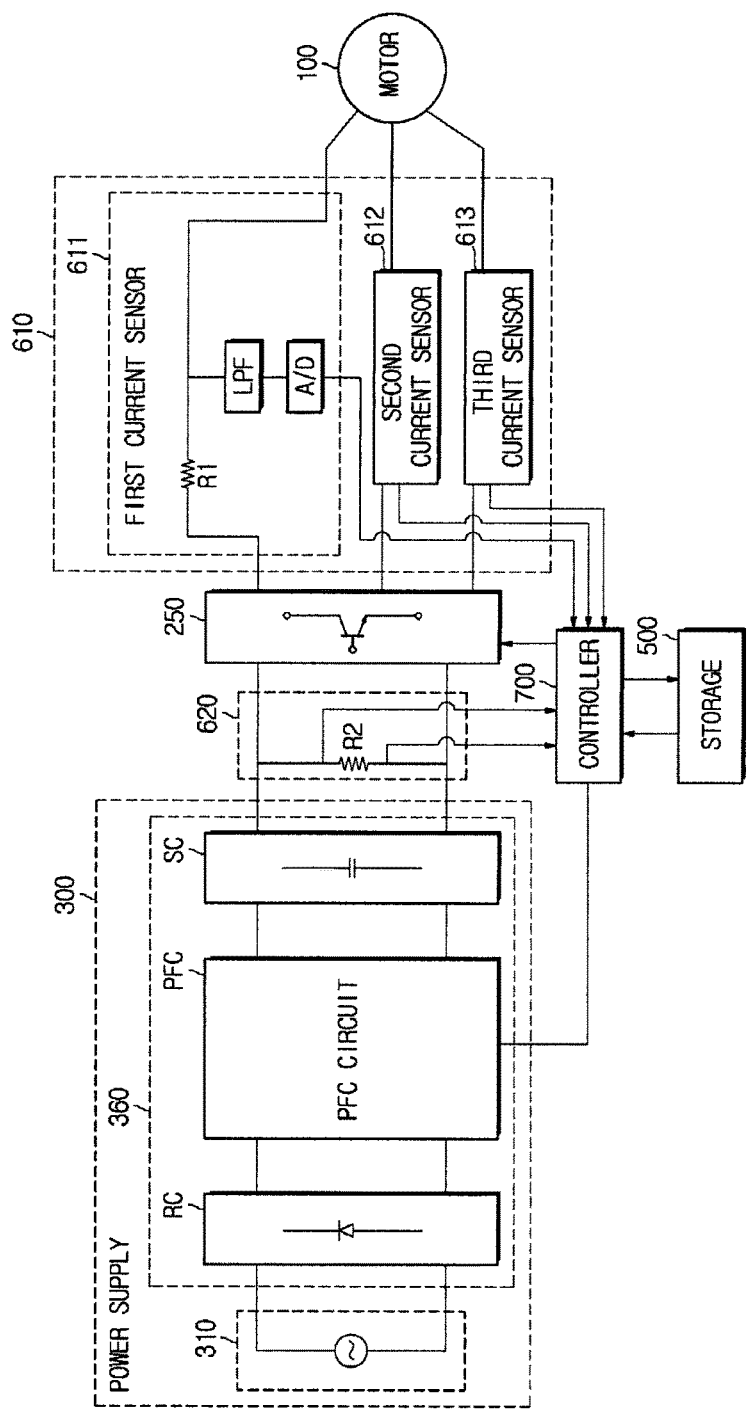
FIG. 2 is a block diagram illustrating the power supply and the sensing unit in more detail.

FIG. 2 is a block diagram illustrating the power supply and the sensing unit in more detail.

As described above, the motor driving apparatus 1 may include the power supply 300 and the sensing unit 600.

The power supply 300 may convert external AC power into DC power. Particularly, the power supply 300 may include the Grid power supply 310 configured to receive external electric energy and supply AC power into the motor driving apparatus 1 and the DC Link power supply 360 configured to convert the supplied AC power into DC power.

The DC Link power supply 360 may include a rectifier circuit RC, a power factor correction circuit PFC, and a smoothing circuit SC.

The rectifier circuit RC may convert AC power received from the Grid power supply 310 into DC power. The rectifier circuit RC may be a full wave bridge rectifier circuit with 4 diodes or a half wave bridge rectifier circuit with 2 diodes and 2 capacitors. In addition, the rectifier circuit RC may have various other circuit configurations to convert AC power into DC power.

The power factor correction circuit PFC may adjust a magnitude of power converted into a DC form. Particularly, the power factor correction circuit PFC may receive a compensation value or a DC power command determined by the controller 700 and adjust the magnitude of DC power to reduce the loss of the power conversion unit.

The smoothing circuit SC may remove the noise of the DC power compensated for by the power factor correction circuit PFC. Particularly, the smoothing circuit SC may be configured as a low pass filter (LPF) and remove the noise of high frequencies. For example, the smoothing circuit SC may be configured such that capacitors are connected in parallel to two nodes or buffers are connected in parallel to capacitors. In addition, the smoothing circuit SC may have various other circuit configurations to remove the noise of the DC power.

The sensing unit 600 may sense the state of the motor driving apparatus 1 and may include the current sensor 610 and the voltage sensor 620.

The current sensor 610 may detect driving current values flowing through three input terminals of the motor 100. That is, the current sensor 610 may include a first current sensor 611 configured to sense a-phase driving current, a second current sensor 612 configured to sense b-phase driving current, and a third current sensor 613 configured to sense c-phase driving current which are respectively disposed on the three input terminals of the motor 100. The current sensor 610 may detect a voltage drop of a shunt resistor R1 connected in series to the input terminal of the motor 100 or detect current using a current detector. In addition, the current sensor 610 may include a low pass filter (LPF) configured to remove noise components included in a current signal of an output terminal of the inverter 250 and an analog-digital (A/D) converter configured to convert an analog current signal from which the noise components are removed into a digital signal. In addition, the current sensor 610 may further include any other device to sense at least one of the a-phase current, b-phase current, and c-phase current.

The voltage sensor 620 may sense a DC voltage that is a power signal of an input terminal of the inverter 250. Particularly, the voltage sensor 620 may be connected in parallel to opposite ends of a resistor R2 connected between a power signal terminal of the inverter 250 and a ground terminal to detect a DC voltage. In addition, the voltage sensor 620 may include a LPF configured to remove noise components included in a voltage signal of the input terminal and an A/D converter configured to convert an analog voltage signal from which the noise components are removed into a digital signal.

The configuration of the motor driving apparatus to drive the motor has been described above. Hereinafter, the configuration of the motor driving apparatus according to embodiments of the present disclosure to compensate for losses of the motor and the power conversion unit will be described.

First, a motor driving apparatus that adjusts a driving current to compensate for a loss of a motor without using an angle sensor and a temperature sensor according to a first exemplary embodiment will be described with reference to FIGS. 4 to 10.

Figure 3:
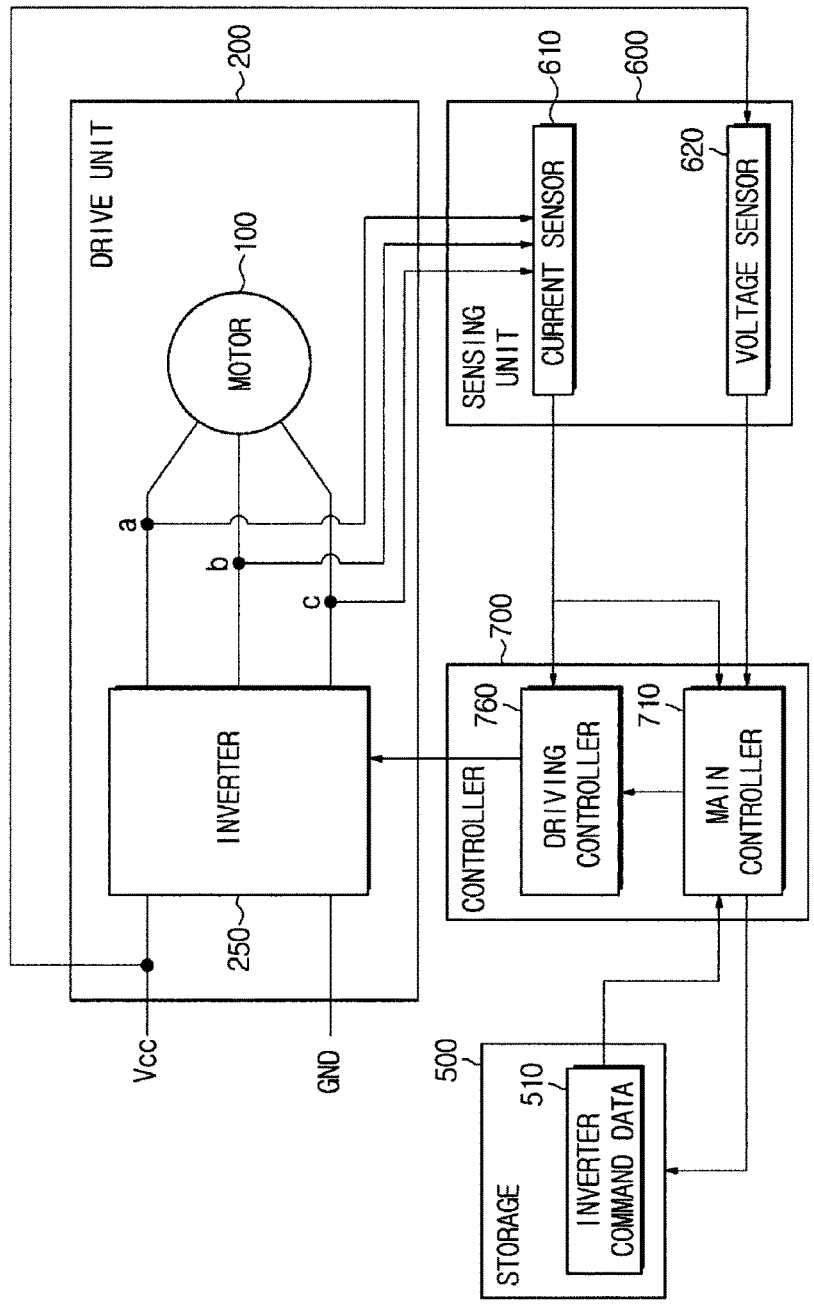
FIG. 3 is a block diagram illustrating a drive unit, a sensing unit, a storage, and a controller of a motor driving apparatus.
Figure 4:
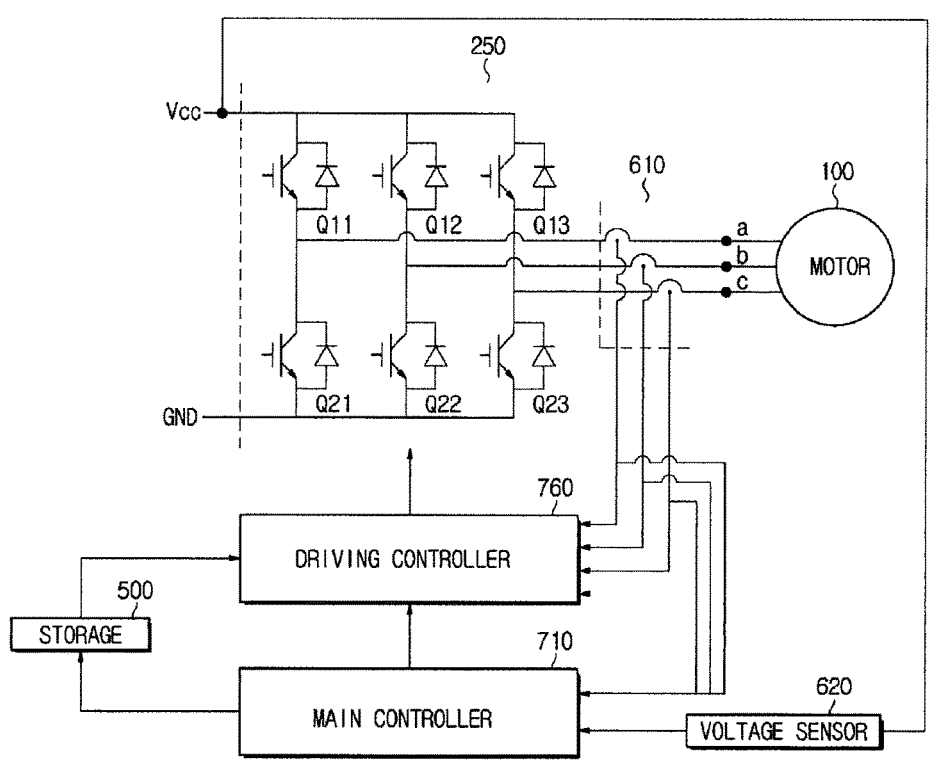
FIG. 4 is a detailed block diagram of an inverter.

FIG. 3 is a block diagram illustrating a drive unit, a sensing unit, a storage, and a controller of a motor driving apparatus. FIG. 4 is a detailed block diagram of an inverter.

The drive unit 200 may include a motor 100 configured to generate a rotational force and the inverter 250 configured to supply a driving current o the motor 100.

As illustrated in FIG. 4, the inverter 250 may include three upper switching circuits Q11 to Q13 and three lower switching circuits Q21 to Q23.

The upper switching circuits Q11 to Q13 and the lower switching circuits Q21 to Q23 may include a high voltage switch such as a high voltage bipolar junction transistor, a high voltage field effect transistor, or an insulated gate bipolar transistor (IGBT) and a Free Wheeling diode.

Particularly, the three upper switching circuits Q11 to Q13 are connected in parallel to a DC supply voltage Vcc, and the three lower switching circuits Q21 to Q23 are connected in parallel to a ground voltage GND. Also, the three upper switching circuits Q11 to Q13 are connected in series to the three lower switching circuits Q21 to Q23 respectively. Three nodes to which the three upper switching circuits Q11 to Q13 and the three lower switching circuits Q21 Q23 are respectively connected are connected to the three input terminals a, b, and c of the motor 100, respectively.

The inverter 250 may supply a driving current to the motor 100 by turning on one of the upper switching circuits Q11 to Q13 and one of the lower switching circuits Q21 to Q23 in a predetermined order.

Figure 5:
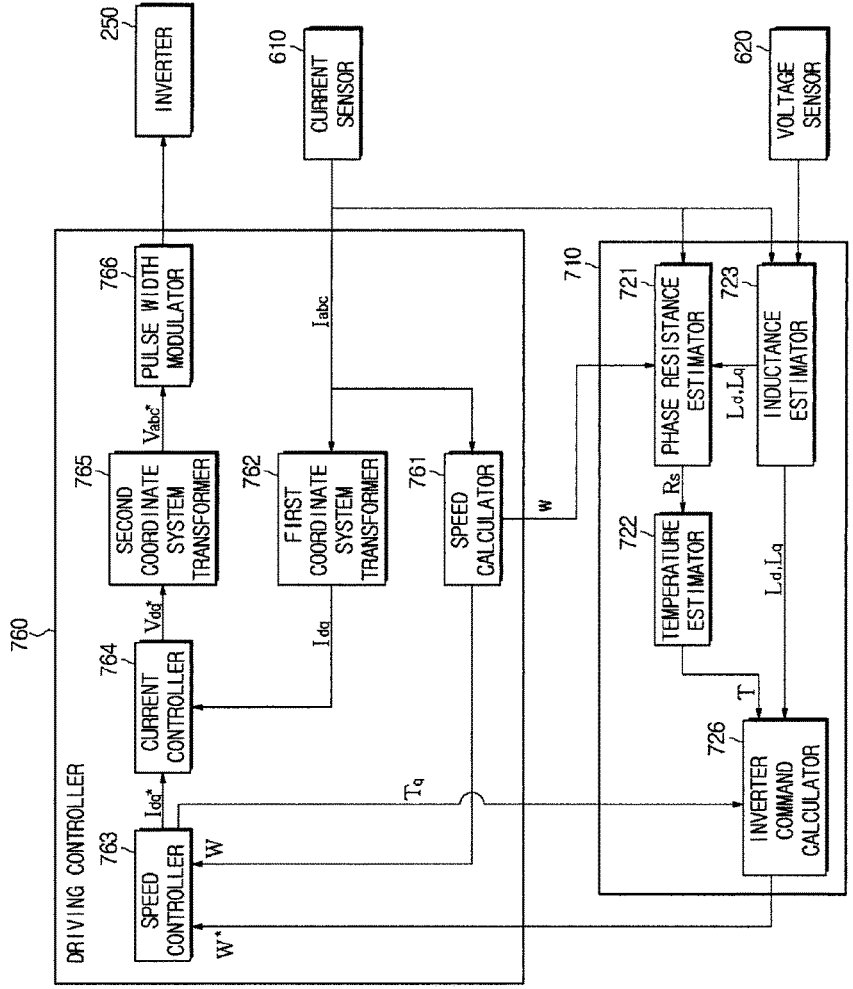
FIG. 5 is a detailed block diagram of the controller.
Figure 6:
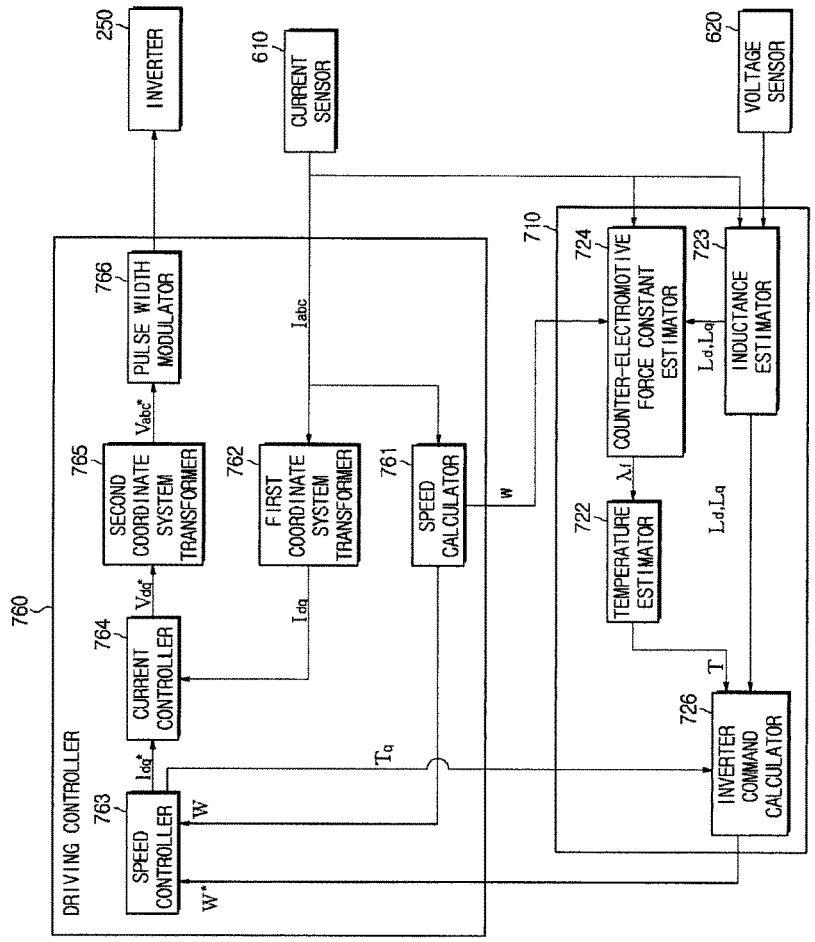
FIG. 6 is another detailed block diagram of the controller.

FIG. 5 is a detailed block diagram of the controller 700. FIG. 6 is another detailed block diagram of the controller 700. In addition, FIG. 7 is a graph illustrating a copper loss and an iron loss, an inverter loss, and a total loss of the motor driving apparatus 1.

Figure 7:
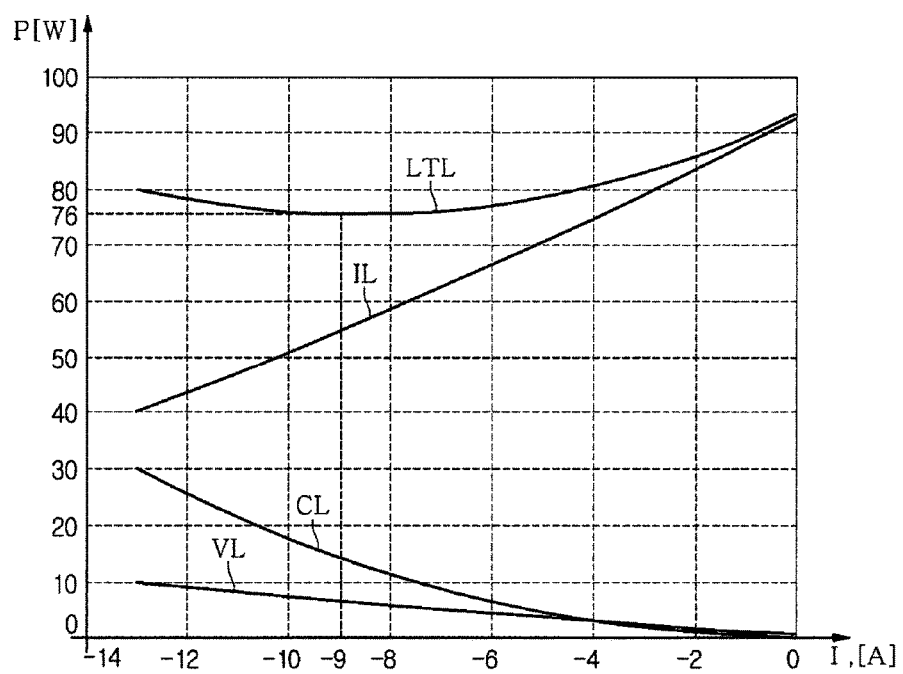
FIG. 7 is a graph illustrating a copper loss and an iron loss, an inverter loss, and a total loss of the motor driving apparatus.

As illustrated in FIG. 7, when the motor 100 is driven, a copper loss that is a current loss and an iron loss that is a magnetic flux loss may occur in the motor 100 and a loss may occur in the inverter 250. In the operation of the motor 100, while the motor 100 is driven below a reference load or a reference speed before a weak magnetic flux control, the controller 700 generally controls the motor 100 under a maximum torque per ampere (MTPA) control mode. However, the MTPA control is a method of compensating for only the copper loss in consideration of the copper loss of the motor 100 not for the iron loss, and thus the iron loss that is a magnetic flux loss occurring during rotation of the motor 100 is not compensated for. Thus, the motor driving apparatus 1 may perform another control method to compensate for the iron loss and the inverter loss.

In this case, the copper loss that is a current loss may be expressed by Equation 1. The iron loss that is a magnetic flux loss may be expressed by the sum of a Hysteresis loss expressed by Equation 2, an eddy current loss expressed by Equation 3, and an anomalous eddy current loss expressed by Equation 4.

$$P_{cooper} = \frac{3}{2} R_s I_s^2 \qquad \text{Equation 1}$$

Equation 1 used to calculate the copper loss. In Equation 1, $P_{cooper}$ is a copper loss, $R_s$ is a phase resistance, and Is is a driving current.

$$P_{hys} = k_{hys} B^n \omega \qquad \text{Equation 2}$$

Equation 2 is used to calculate the Hysteresis loss. In Equation 2, $P_{hys}$ is a Hysteresis loss, $k_{hys}$ is a Hysteresis constant, B is a magnetic flux density, and $\omega$ is a rotational speed of the motor.

$$P_{eddy} = k_{eddy} B^2 \omega^2 \qquad \text{Equation 3}$$

Equation 3 is used to calculate the eddy current loss. In Equation 3, $P_{eddy}$ is an eddy current loss and $k_{eddy}$ is an eddy current constant.

$$P_{exe} = k_{exe} B^{1.5} \omega^{1.5} \qquad \text{Equation 4}$$

Equation 4 is used to calculate the anomalous eddy current loss. In Equation 4, $P_{exe}$ is an anomalous eddy current loss and $k_{exe}$ is an anomalous eddy current constant.

Here, the iron loss may be a value obtained by adding the Hysteresis loss of Equation 2, the eddy current loss of Equation 3, and the anomalous eddy current loss of Equation 4. Also, the Hysteresis constant, the eddy current constant, and the anomalous eddy current constant may be pre-stored in the storage 500 as the pre-stored parameters 590.

Particularly, as illustrated in FIG. 7, when a rotational speed is 6600 rpm and a torque, as a load, is 0.5 Nm, a copper loss CL increases as d-axis current increases in the case where q-axis current is supplied thereto while an iron loss IL and an inverter loss VL decrease as the d-axis current increases. After a comprehensive consideration about the copper loss CL, the iron loss IL, and the inverter loss VL, it is confirmed that the total loss LTL does not increase or decrease as the d-axis current decreases or increases. When the d-axis current is −9 A, a minimum total loss LTL of 76 W is consumed. Thus, when the motor 100 rotates at 6600 rpm and a load of 0.5 Nm is applied thereto, the d-axis current should be adjusted to −9 A to minimize the total loss LTL obtained by combining the copper loss CL, the iron loss IL, and the inverter loss VL.

As illustrated in FIG. 5, the controller 700 may include the main controller 710 and the driving controller 760.

The main controller 710 may calculate a speed command w* by retrieving the inverter command data 510 from the storage 500 in accordance with an operation instruction of the user and transmit the speed command w* to the driving controller 760.

Also, the main controller 710 may adjust the driving current to minimize losses based on a driving current sensed by the current sensor 610 and a DC voltage sensed by the voltage sensor 620. Particularly, the main controller 710 may include a phase resistance estimator 721, a temperature estimator 722, an inductance estimator 723, and an inverter command calculator 726.

The phase resistance estimator 721 may estimate a phase resistance of the motor 100 based on the driving current sensed by the current sensor 610, the rotational speed calculated by the speed calculator 761, and the inductance of the motor 100. This may be reviewed using Equation 5.

$$R_s = f_1(I_d, I_q, L_d, L_q, \omega) \qquad \text{Equation 5}$$

Equation 5 is used to calculate the phase resistance. In Equation 5, $f_1$ is a function of calculating a phase resistance, $I_d$ is a d-axis current, $I_q$ is a q-axis current, $L_d$ is a d-axis inductance, and $L_q$ is a q-axis inductance.

When the phase resistance estimator 721 estimates the phase resistance using Equation 5, a current temperature of the motor 100 may be estimated using the estimated phase resistance.

Figure 8:
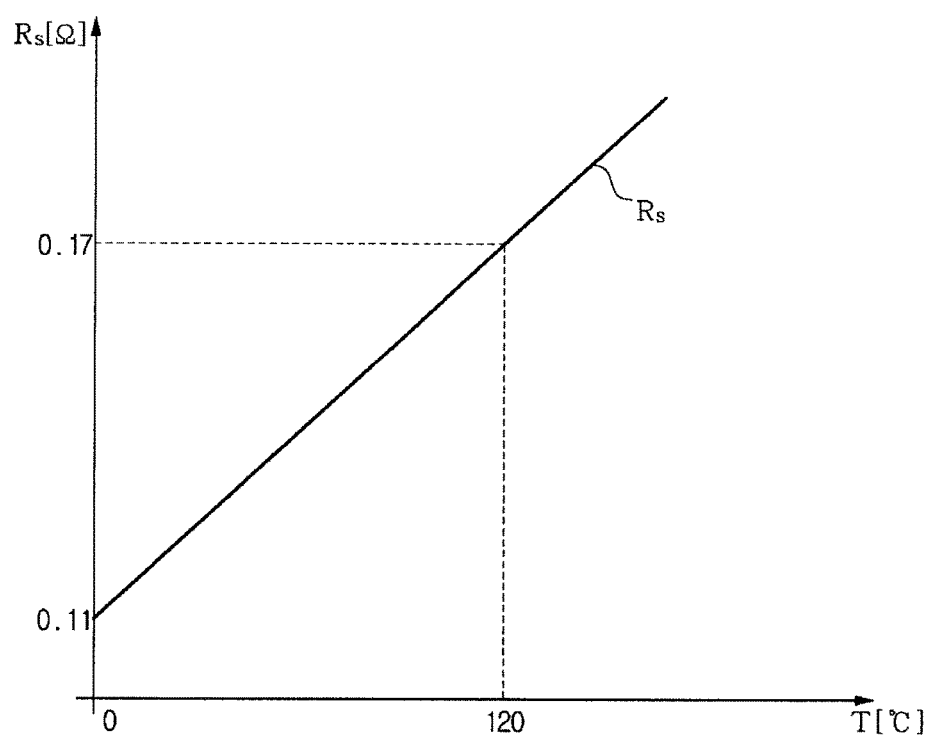
FIG. 8 is a graph illustrating phase resistance of the motor with respect to temperature.

FIG. 8 is a graph illustrating phase resistance of the motor with respect to temperature. As illustrated in FIG. 8, the phase resistance linearly increases as the temperature increases. For example, while a phase resistance is 0.11Ω when a temperature of the motor 100 is 0° C., the phase resistance is 0.17Ω when the temperature of the motor 100 is 120° C. Thus, this relationship may be expressed by Equation 6.

$$\text{Temp} = f_2(R_s) \qquad \text{Equation 6}$$

Equation 6 is used to calculate the temperature of the motor 100. In Equation 6, Temp is a temperature of the motor and $f_2$ is a function of calculating a phase resistance.

That is, the temperature estimator 722 may estimate a temperature of the motor 100 using Equation 6. Also, the temperature estimator 722 may transmit the temperature of the motor 100 estimated using Equation 6 to the inverter command calculator 726.

In addition, the temperature estimator 722 may estimate the temperature using any other factors such as a counter-electromotive force constant which will be described with reference to FIGS. 6 to 9 in addition to the method using the phase resistance.

Figure 9:
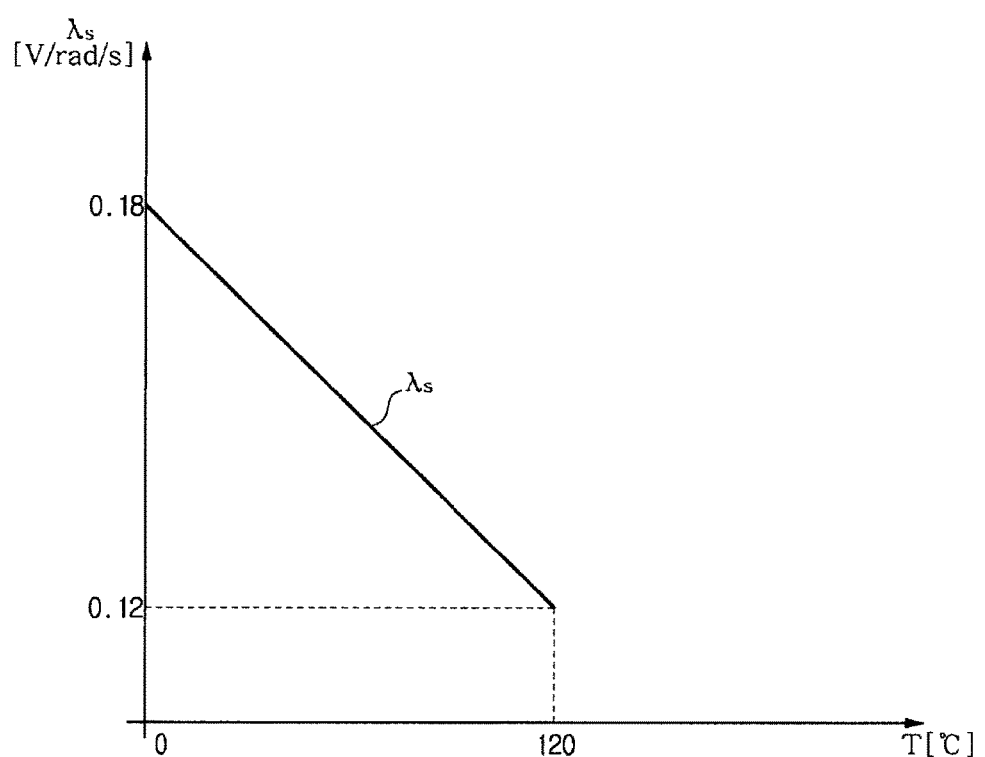
FIG. 9 is a graph illustrating counter-electromotive force constant of the motor with respect to temperature.

FIG. 9 is a graph illustrating counter-electromotive force constant of the motor with respect to temperature.

As illustrated in FIG. 9, the temperature of the motor 100 linearly decreases as the counter-electromotive force constant increases. For example, while a counter-electromotive force constant is 0.18 v/rad/s when the temperature of the motor 100 is 0° C., the counter-electromotive force constant is 0.12 v/rad/s when a temperature of the motor 100 is 120° C.

Thus, as illustrated in FIG. 6, the main controller 710 includes the counter-electromotive force constant estimator 724, and the counter-electromotive force constant estimator 724 may estimate the counter-electromotive force constant based on the driving current sensed by the current sensor 610 and the rotational speed calculated by the speed calculator 761 and transmit the estimated counter-electromotive force constant to the temperature estimator 722.

The temperature estimator 722 may estimate a current temperature of the motor 100 based on the estimated counter-electromotive force constant having the relationship as illustrated in FIG. 9 and transmit the estimated temperature to the inverter command calculator 726.

The inductance estimator 723 may calculate a d-axis inductance and a q-axis inductance based on the driving current sensed by the current sensor 610 and the DC voltage sensed by the voltage sensor 620. For example, the inductance estimator 723 may calculate the d-axis inductance and the q-axis inductance using a voltage equation by supply a test voltage to the motor 100. In addition, the inductance estimator 723 may calculate the d-axis inductance and the q-axis inductance by retrieving the pre-stored parameters 590 from the storage 500 and searching for data corresponding to the driving current sensed by the current sensor 610 and the DC voltage sensed by the voltage sensor 620. In addition, various other methods may also be used to estimate the d-axis inductance and the q-axis inductance.

The inverter command calculator 726 may determine an inverter command or a speed command to adjust a driving current for compensating for the copper loss and the iron loss based on the temperature of the motor 100 estimated by the temperature estimator 722, the d-axis inductance and the q-axis inductance estimated by the inductance estimator 723, the rotational speed of the motor 100 calculated by the speed calculator 761, and the torque corresponding to the load of the motor 100 calculated while controlling the torque by the speed controller 763. Also, the inverter command calculator 726 may use the inverter command data 510 stored in the storage 500 to determine the inverter command or the speed command. Particularly, the inverter command calculator 726 may determine the inverter command or the speed command by using the inverter command calculating formula 511 that is a continuous command calculating method or by using the inverter command data table 512 that is a discontinuous command calculating method.

A method of calculating the inverter command or the speed command by using the inverter command calculating formula 511 that is continuous command calculating method will be described with reference to Equation 7.

$$\omega^* = f_3(\text{Temp}, L_d, L_q, T, \omega) \quad \text{Equation 7}$$

Equation 7 is used to calculate the speed command to adjust the driving current. In Equation 7, w* is a speed command and $f_3$ is a function of calculating a speed command.

The inverter command calculator 726 may calculate a speed command as an output by using the temperature, the d-axis inductance, the q-axis inductance, the torque, and the rotational speed of the motor 100 as input variables of Equation 7 and transmit the output to the main controller 710.

Although the case where the driving current is adjusted by transmitting the speed command calculated by the inverter command calculator 726 to the main controller 710 has been exemplarily described above, the inverter command calculator 726 may also calculate an inverter command or a current command and transmit the calculated inverter command and current command to the inverter 250 or the main controller 710 to adjust the driving current.

The driving controller 760 may transmit a control signal to the inverter 250 to adjust the driving current based on the speed command determined by and received from the inverter command calculator 726.

Particularly, the driving controller 760 calculates a d-axis current command and a q-axis current command Idq* by comparing the speed command with the rotational speed, calculates a dq-axis voltage command by comparing the calculated dq-axis current command Idq* with a dq-axis current Idq, and transmit a control signal to the inverter 250.

In addition, the driving controller 760 may include a speed calculator 761, a speed controller 763, a first coordinate system transformer 762, a current controller 764, a second coordinate system transformer 765, and a pulse width modulator 766.

The speed calculator 761 may calculate a rotational speed w of the motor 100 based on a switching frequency transmitted from the pulse width modulator 766 to the inverter 250 and the driving current sensed by the current sensor 610 and provide the result to the speed controller 763 and the main controller 710.

The speed controller 763 may calculate the dq-axis current command Idq* by comparing the speed command w* output from the main controller 710 and the rotational speed w of the motor 100 output from the speed calculator 761 and provide the result to the current controller 764.

The first coordinate system transformer 762 may convert the driving current Iabc of the motor 100 output from the current sensor 610 into the dq-axis current Idq and provide the result to the current controller 764.

The current controller 764 may calculate a dq-axis voltage command Vdq* by comparing the dq-axis current command Idq* output from the speed controller 763 and the dq-axis current Idq output from the first coordinate system transformer 762 and provide the result to the second coordinate system transformer 765.

The second coordinate system transformer 765 may convert the dq-axis voltage command Vdq* output from the current controller 764 into a driving voltage command Vabc* and provide the result to the pulse width modulator 766.

The pulse width modulator 766 may output a pulse width modulating signal to control the upper switching circuits Q11 to Q13 and the lower switching circuits Q21 to Q23 included in the inverter 250 based on the driving voltage command Vabc* output from the second coordinate system transformer 765.

Figure 10:
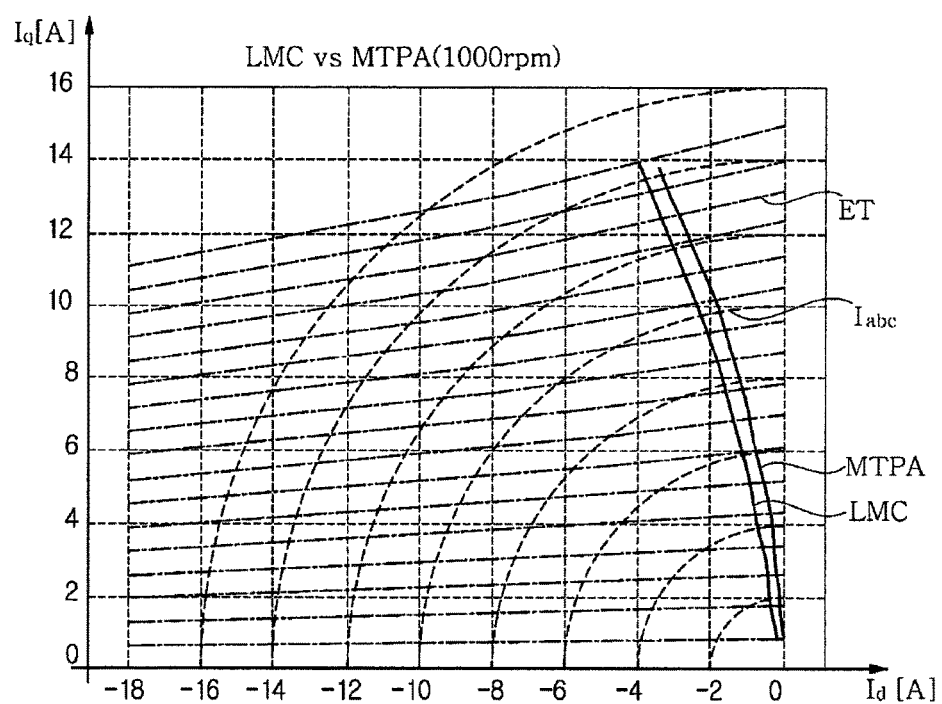
FIG. 10 is a graph illustrating d-axis current and q-axis current according to MTPA and d-axis current and q-axis current according to the first exemplary embodiment.

FIG. 10 is a graph illustrating d-axis current and q-axis current according to MTPA and d-axis current and q-axis current according to the first exemplary embodiment.

That is, FIG. 10 is a graph to determine a point where a maximum torque per unit current is obtained in consideration of a loss of the motor 100. A maximum torque per unit current is obtained at a point where the copper loss as a current loss is the lowest in an equal torque curve ET.

As described above, the driving current to compensate for only the copper loss according to the MTPA control may be different from the driving current to compensate for both the copper loss and the iron loss.

Particularly, as illustrated in FIG. 10, a dq-axis current curve MTPA in accordance with the MTPA control compensating for only the copper loss is located on the left side of a dq-axis current curve LMC in accordance with a loss minimization control (LMC) control compensating for both the copper loss and the iron loss. That is, the magnitude of the d-axis current and q-axis current to compensate for only the copper loss at the same torque is different from those to compensate for both the copper loss and the iron loss.

In addition, although the d-axis inductance, the q-axis inductance, and the counter-electromotive force constant are estimated according to the first exemplary embodiment, the pre-stored parameters 590 may also be retrieved from the storage 500 and used without performing estimation.

Hereinafter, a motor driving apparatus that adjusts a DC voltage to compensate for a loss of a power conversion unit without using an angle sensor according to a second exemplary embodiment will be described with reference to FIGS. 11 to 14.

Figure 11:
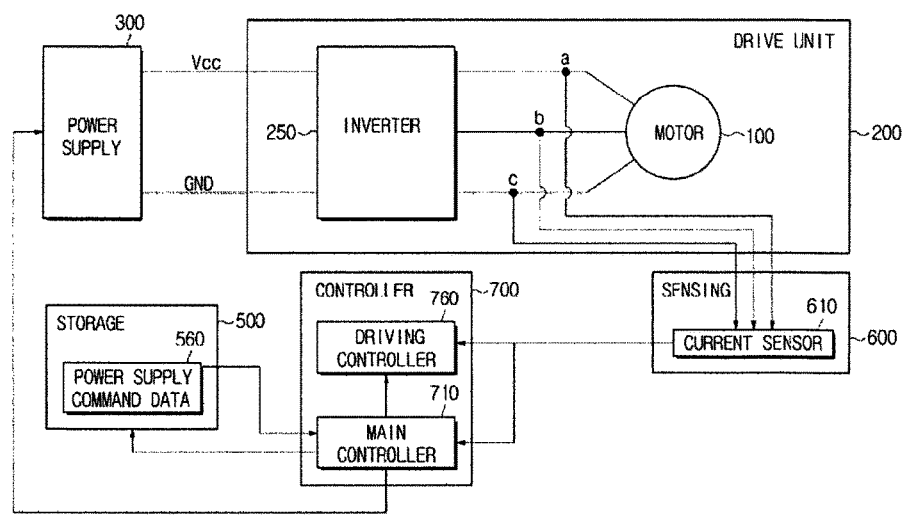
FIG. 11 is a block diagram illustrating a drive unit, a sensing unit, a storage, and a controller of a motor driving apparatus.
Figure 12:
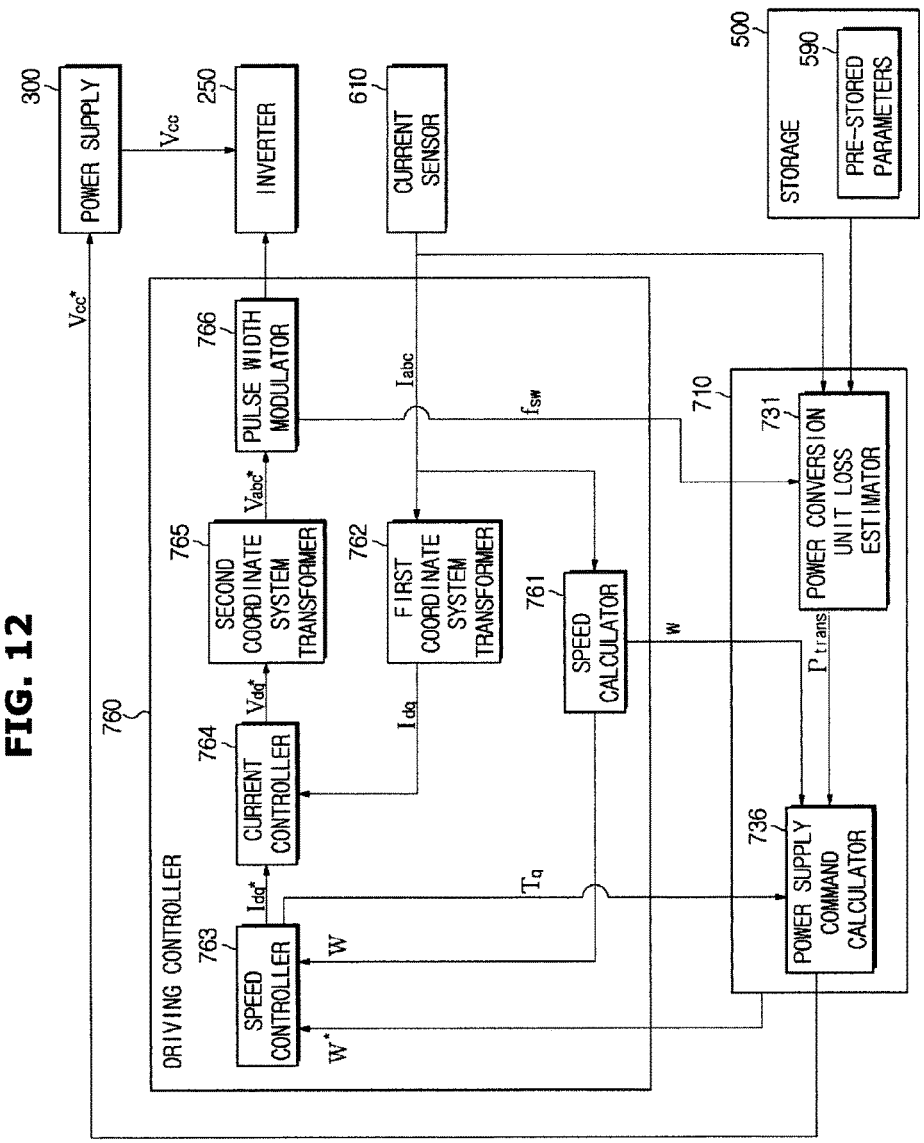
FIG. 12 is a detailed block diagram of the controller.
Figure 13:
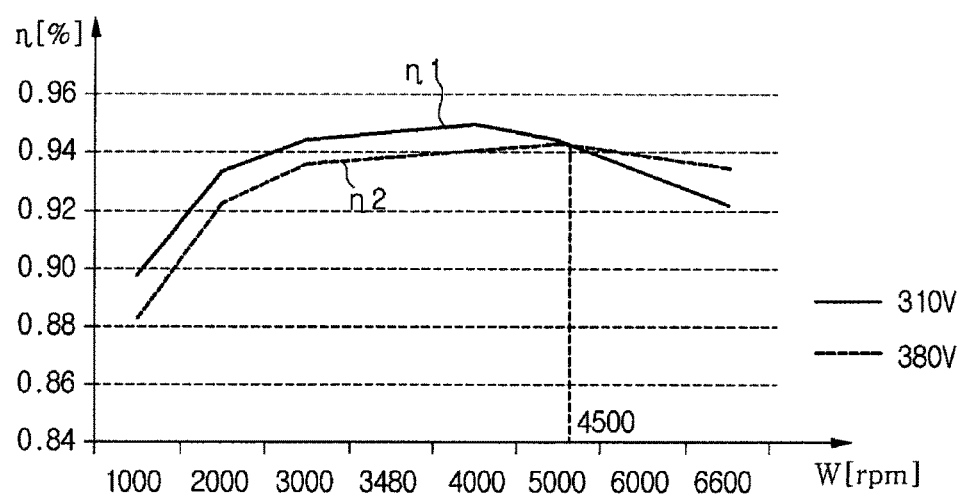
FIG. 13 is a graph illustrating efficiency of a DC voltage with respect to rotational speed of a motor.
Figure 14:
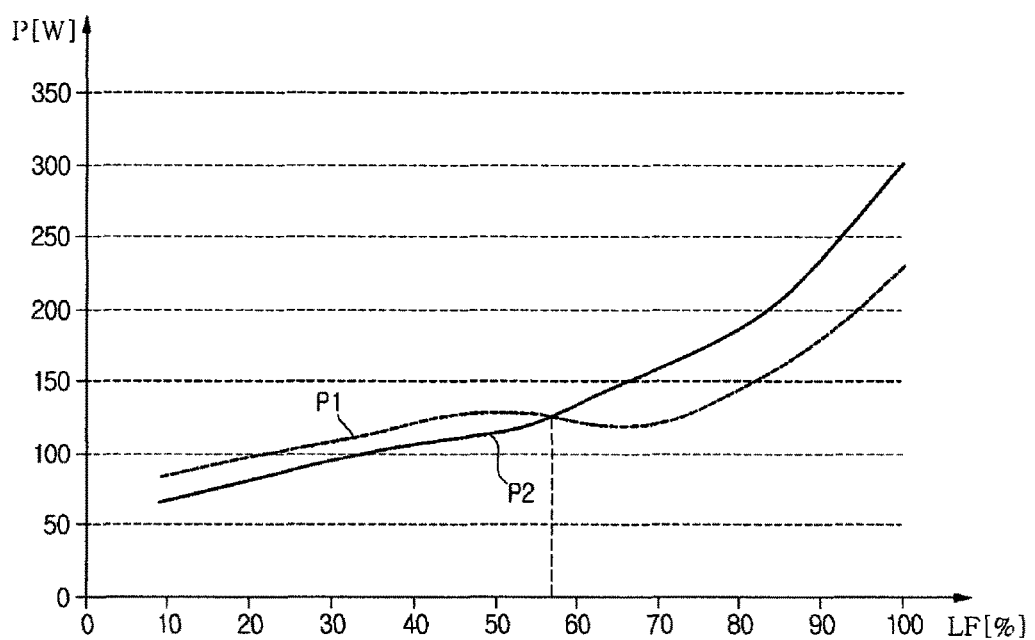
FIG. 14 is a graph illustrating losses of the DC voltage with respect to load of the motor.

FIG. 11 is a block diagram illustrating a drive unit, a sensing unit, a storage, and a controller of a motor driving apparatus. FIG. 12 is a detailed block diagram of the controller. FIG. 13 is a graph illustrating efficiency of a DC voltage with respect to rotational speed of a motor. FIG. 14 is a graph illustrating losses of the DC voltage with respect to load of the motor.

As illustrated in FIG. 13, the efficiency of the motor 100 may vary in accordance with the magnitude of a DC power supplied to the inverter 250 and a rotational speed of the motor 100.

Particularly, when a DC voltage is 310 V, efficiency η1 of the motor 100 increases as the rotational speed of the motor 100 increases from the beginning of driving of the motor 100. However, the efficiency η1 is maximized at a rotational speed of about 3600 rpm and decreases therefrom.

In addition, when the DC voltage is 380 V, efficiency η2 of the motor 100 increases as the rotational speed increases from the beginning of driving of the motor 100. However, the efficiency η2 is maximized at a rotational speed of about 4500 rpm and decreases therefrom.

In this regard, in comparison between the case where the DC voltage is 310 V and the case where the DC voltage is 380 V, the efficiency η1 in the case where the DC voltage is 310 V is greater than the efficiency η2 in the case where the DC voltage is 380 V in a rotational speed range of from 0 rpm to 4500 rpm. However, when the rotational speed of the motor 100 is greater than 4500 rpm, the efficiency η2 of the DC voltage of 380 V is greater than the efficiency η1 of the DC voltage of 310 V.

In addition to the case of considering the motor 100 as illustrated in FIG. 13, power consumption may vary in accordance with the magnitude of the DC power supplied to the inverter 250 and a load of the motor 100 in the case of considering the motor 100 and the inverter 250 as illustrated in FIG. 14.

Particularly, when a DC voltage is 310 V, losses of the motor 100 and the inverter 250 slowly increase as a load of the motor 100 increases from the beginning of driving of the motor 100 and rapidly increase from a point where the load is 55% P2.

In addition, when the DC voltage is 380 V, losses of the motor 100 and the inverter 250 increase as the load of the motor 100 increases from the beginning of driving of the motor 100 and decrease in a load range of from 50% to 65%. However, the losses of the motor 100 and the inverter 250 increase again from a point where the load is 65% P1.

In this regard, in comparison between the case where the DC voltage is 310 V and the case where the DC voltage is 380 V, the losses P2 of the motor 100 and the inverter 250 in the case where the DC voltage is 310 V are less than those P1 in the case where the DC voltage is 380 V in a load range of from 0% to 57%. However, when the load of the motor 100 is greater than 57%, the losses P1 in the case where the DC voltage is 380 V are less than those P2 in the case where the DC voltage is 310 V.

Thus, the losses of the motor driving apparatus 1 may be compensated for by adjusting the DC voltage based on a phenomenon where the efficiency of the motor 100 and power consumption of the motor driving apparatus 1 vary with respect to the DC voltage as illustrated in FIGS. 13 and 14.

As illustrated in FIGS. 11 and 14, the driving controller 760 may control the power supply 300 to adjust the DC power by calculating a DC voltage command based on the rotational speed and the torque of the motor 100 and the loss of the power conversion unit and transmitting the calculated DC voltage command to the power supply 300.

Here, the loss of the power conversion unit may include a switching loss and a conduction loss. The switching loss may be expressed by Equation 8 and the conduction loss may be expressed by Equation 9.

$$P_{sw} = \frac{6(E_T + E_D)f_{sw}I_{max}}{\pi} \quad \text{Equation 8}$$

Equation 8 is used to calculate the switching loss. In Equation 8, $E_T$ and $E_D$ are variables with no or little changes and information about $E_T$ and $E_D$ may be stored in the storage 500 as the pre-stored parameters 590.

$$P_{con} = \frac{3I_{max}}{\pi}(V_T + V_D) + \frac{3I_{max}^2}{4}(R_T + R_D) \quad \text{Equation 9}$$

Equation 9 is used to calculate the conduction loss. In Equation 9, $V_T$, $V_D$, $R_T$ and $R_D$ are variables with no or little changes and information about $V_T$, $V_D$, $R_T$ and $R_D$ may be stored in the storage 500 as the pre-stored parameters 590.

The driving controller 760 may calculate a DC voltage command to adjust the DC power to compensate the switching loss of Equation 8 and the conduction loss of Equation 9.

Particularly, the driving controller 760 may include a power conversion unit loss estimator 731 and a power supply command calculator 736.

The power conversion unit loss estimator 731 may estimate a loss of the power conversion unit based on the driving current sensed by the current sensor 610, the switching frequency received from the pulse width modulator 766, and a data sheet of the power conversion unit among the parameters 590 pre-stored in the storage 500.

In addition, the power conversion unit loss estimator 731 may perform discontinuous calculations by using data stored in a look-up-table form or continuous calculations in the form of function. Continuous calculations will be described with reference to Equation 10.

$$P_{trans} = f_4(DS_{trans}, I_{abc}, f_{sw}) \quad \text{Equation 10}$$

Equation 10 is used to calculate the loss of the power conversion unit. In Equation 10, $P_{trans}$ is a loss of the power conversion unit, $f_4$ is a function of calculating a loss of the power conversion unit, $DS_{trans}$ is a data sheet of the power conversion unit, and $f_{sw}$ is a switching frequency of the power conversion unit.

As shown in Equation 10, the power conversion unit loss estimator 731 may estimate the loss of the power conversion unit based on the data sheet of the power conversion unit, the driving current, and the switching frequency and transmit the estimated loss of the power conversion unit to the power supply command calculator 736.

The power supply command calculator 736 may determine a DC voltage command to adjust the DC voltage to compensate for the loss of the power conversion unit based on the loss of the power conversion unit estimated by the power conversion unit loss estimator 731, the rotational speed of the motor 100 calculated by the speed calculator 761, and the torque of the motor 100 calculated during controlling of the torque by the speed controller 763. Also, the power supply command calculator 736 may use the power supply command data 560 stored in the storage 500 to determine the DC voltage command. Particularly, the power supply command calculator 736 may determine the DC voltage command by using the power supply command calculating formula 561 that is a continuous command calculating method or by using the power supply command data table 562 that is a discontinuous command calculating method.

Calculation of the power supply command using the power supply command calculating formula 561 as the continuous command calculating method will be described with reference to Equation 11.

$$V^*_{cc} = f_5(T, \omega, P_{trans})$$ Equation 11

Equation 11 is used to calculate the DC voltage command. In Equation 11, $V^*_{cc}$ is a DC voltage command and $f_5$ is a function of calculating a DC voltage command.

The power supply command calculator 736 may calculate a DC voltage command as an output by using the torque and the rotational speed of the motor 100 and the loss of the power conversion unit as input variables of Equation 11 and transmit the output to the power supply 300.

The power supply 300 may compensate for the loss of the power conversion unit by adjusting the DC voltage based on the DC voltage command received from the power supply command calculator 736.

For example, the motor driving apparatus 1 may compensate for the loss of the power conversion unit by adjusting the DC voltage to 310 V when the rotational speed is less than a predetermined speed and the torque is less than a predetermined torque and by adjusting the DC voltage to 380 V when the rotational speed is equal to or greater than the predetermined speed and the torque is equal to or greater than the predetermined torque.

In addition, the motor driving apparatus 1 may compensate for the loss of the power conversion unit by considering both of the loss of the inverter 250 and the loss of the power supply 300 which are components of the power conversion unit. However, the motor driving apparatus 1 may also compensate for the loss of the inverter 250 by considering only the loss of the inverter 250 or compensate for the loss of the power supply 300 by considering only the loss of the power supply 300.

The case where the driving current of the inverter is adjusted to compensate for the copper loss and the iron loss of the motor according to the first exemplary embodiment and the case where the DC voltage of the power supply is adjusted to compensate for the loss of the power conversion unit according to the second exemplary embodiment have been described above.

Figure 16:
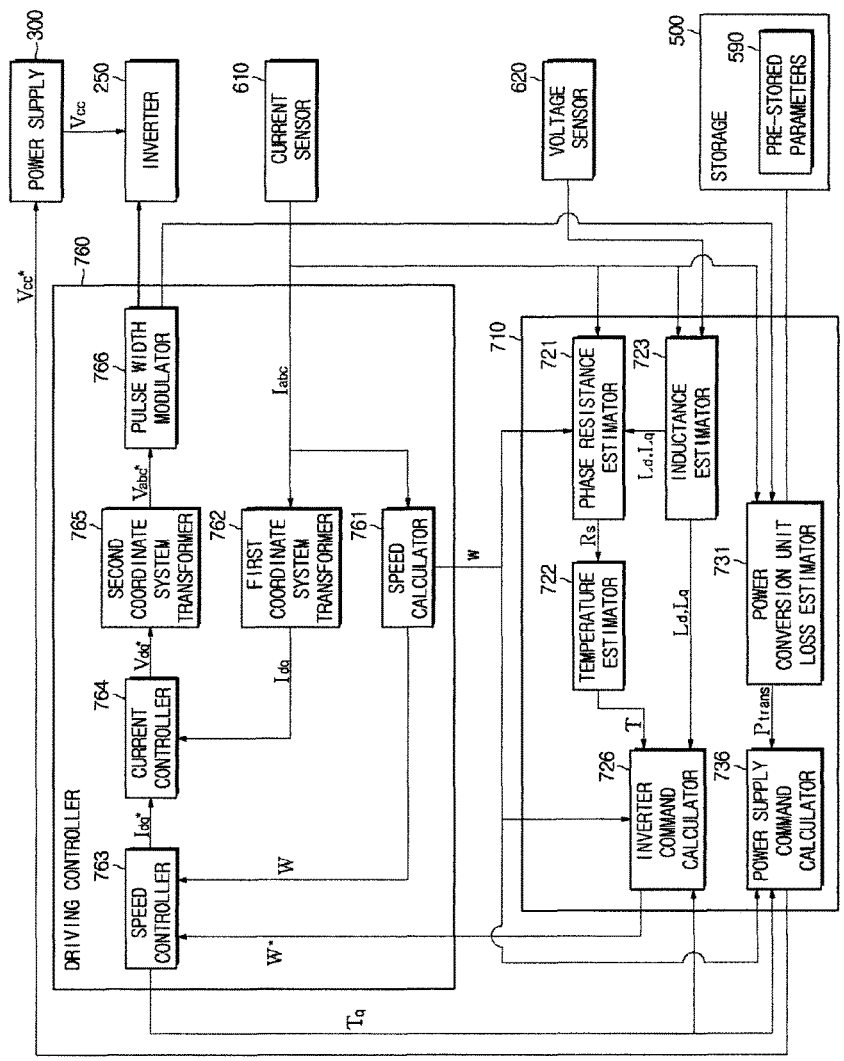
FIG. 16 is a detailed block diagram of the controller.
Figure 17:
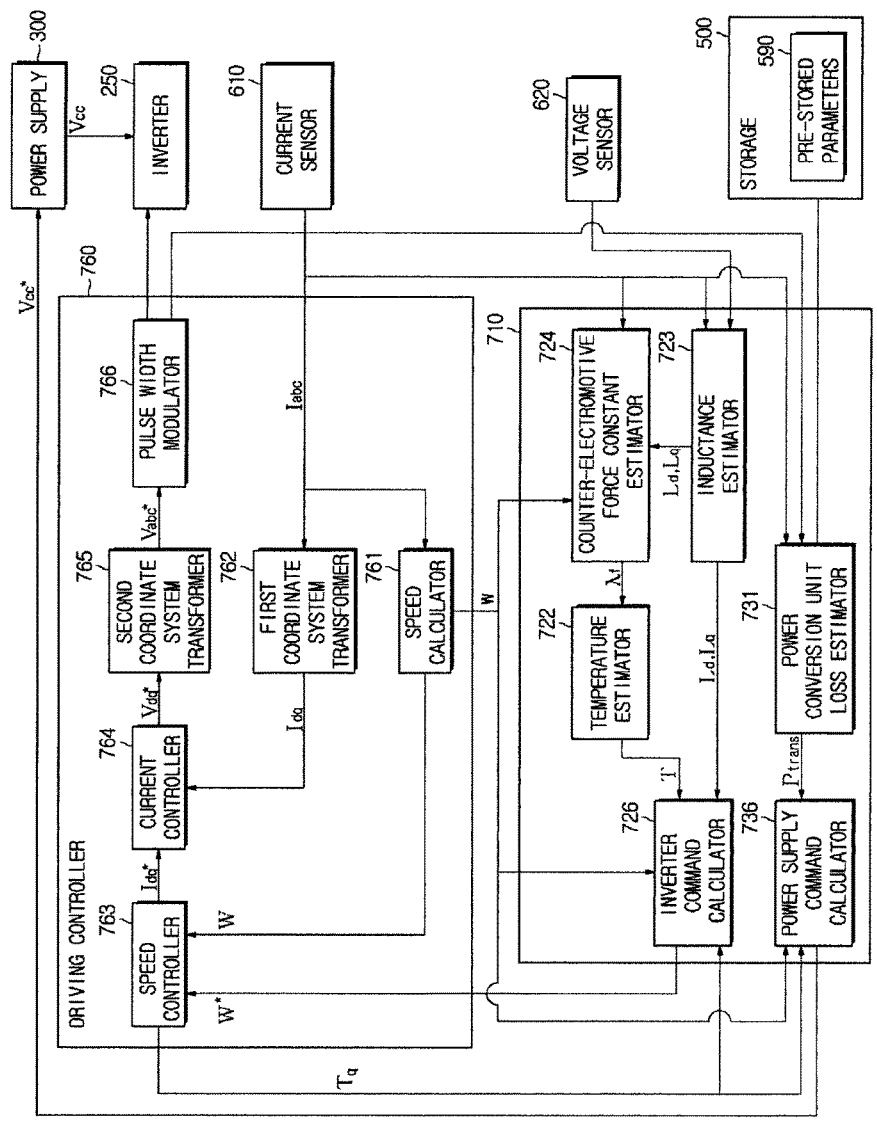
FIG. 17 is another detailed block diagram of the controller.

Hereinafter, a motor driving apparatus that adjusts a driving current and a DC voltage to compensate for a copper loss and an iron loss of a motor and a loss of a power conversion unit according to a third exemplary embodiment will be described with reference to FIGS. 15 to 17.

Figure 15:
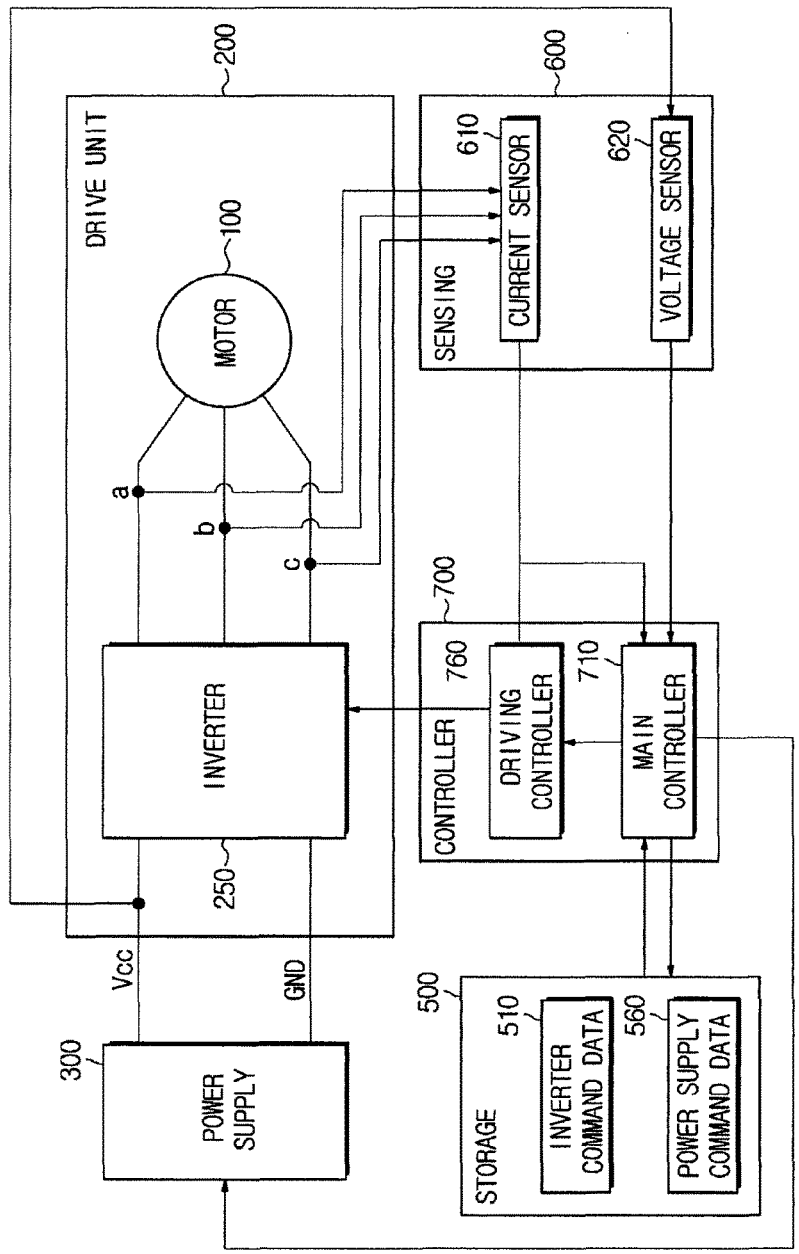
FIG. 15 is a block diagram illustrating a drive unit, a sensing unit, a storage, and a controller of a motor driving apparatus.

FIG. 15 is a block diagram illustrating a drive unit, a sensing unit, a storage, and a controller of a motor driving apparatus. FIG. 16 is a detailed block diagram of the controller. FIG. 17 is another detailed block diagram of the controller.

The current sensor 610 may sense a driving current supplied to the motor 100 and the voltage sensor 620 may sense a DC voltage supplied to the inverter 250 and the driving current and the DC voltage may be transmitted to the main controller 710 and the driving controller 760.

The main controller 710 may receive the driving current and the DC voltage respectively sensed by the current sensor 610 and the voltage sensor 620 and estimate a temperature and an inductance of the motor 100 and a loss of the power conversion unit.

Particularly, the phase resistance estimator 721 may estimate a phase resistance based on the driving current, the rotational speed, and the inductance, and the temperature estimator 722 may estimate a temperature of the motor 100 based on the estimated phase resistance. However, the temperature may also be estimated without using the phase resistance. The counter-electromotive force constant estimator 724 may estimate a counter-electromotive force constant based on the driving current and the rotational speed and the temperature estimator 722 may estimate a temperature of the motor 100 based on the estimated counter-electromotive force constant.

The inductance estimator 723 may calculate a d-axis inductance and a q-axis inductance based on the sensed driving current and DC voltage. For example, the inductance estimator 723 may calculate the d-axis inductance and q-axis inductance using a voltage equation by supplying a test voltage to the motor 100. Also, the inductance estimator 723 may calculate the d-axis inductance and the q-axis inductance by searching for data corresponding to the driving current sensed by the current sensor 610 and the DC voltage sensed by the voltage sensor 620 by retrieving the pre-stored parameters 590 from the storage 500. In addition, various other methods may also be used to estimate the d-axis inductance and the q-axis inductance.

The power conversion unit loss estimator 731 may estimate the loss of the power conversion unit based on the sensed driving current, the switching frequency determined by the pulse width modulator 766, and the data sheet of the power conversion unit among the parameters 590 pre-stored in the storage 500.

The inverter command calculator 726 may calculate an inverter command or a speed command based on the temperature of the motor 100 estimated by the temperature estimator 722, the d-axis inductance and the q-axis inductance estimated by the inductance estimator 723, the rotational speed of the motor 100 calculated by the speed calculator 761, and the torque of the motor 100 calculated during controlling of the torque by the speed controller 763 and transmit the calculated command to the inverter 250 or the speed controller 763. In addition, the power supply command calculator 736 may calculate a DC voltage command based on the loss of the power conversion unit estimated by the power conversion unit loss estimator 731, the rotational speed of the motor 100 calculated by the speed calculator 761, and the torque of the motor 100 calculated during controlling of the torque by the speed controller 763 and transmit the calculated DC voltage command to the power supply 300.

The inverter 250 may compensate for the copper loss and the iron loss of the motor 100 by adjusting the driving current based on a control signal received from the inverter command calculator 726 or the main controller 710. Also, the power supply 300 may compensate for the loss of the power conversion unit such as the inverter 250 and the power supply 300 by adjusting the DC voltage based on the DC voltage command as a control signal received from the power supply command calculator 736.

Hereinafter, a motor driving apparatus that calculates a rotational speed by sensing a rotational displacement of the motor by using an angle sensor according to a fourth exemplary embodiment different from the first exemplary embodiment in which the speed is calculated in a sensorless manner without using the angle sensor will be described.

Figure 18:
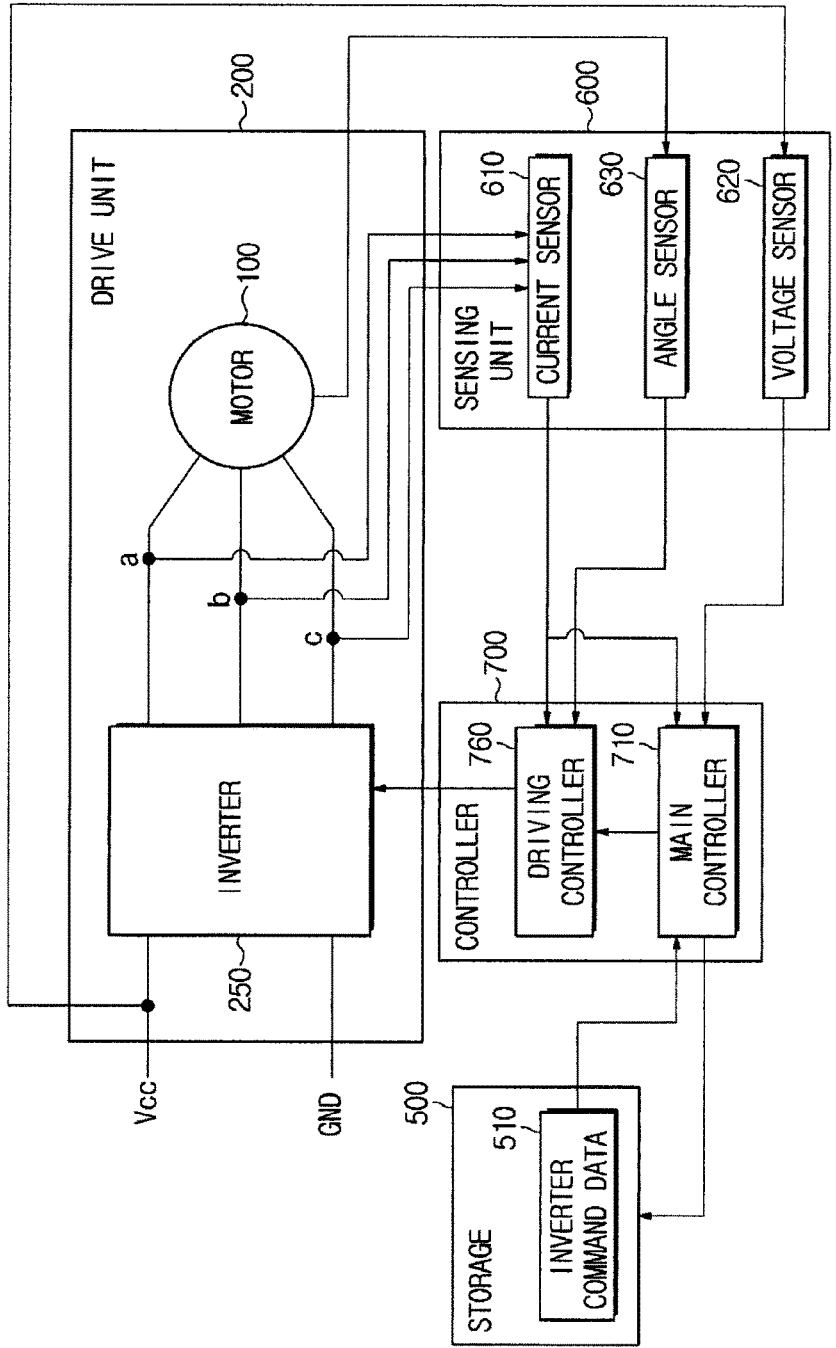
FIG. 18 is a block diagram illustrating a drive unit, a sensing unit, a storage, and a controller of a motor driving apparatus.
Figure 19:
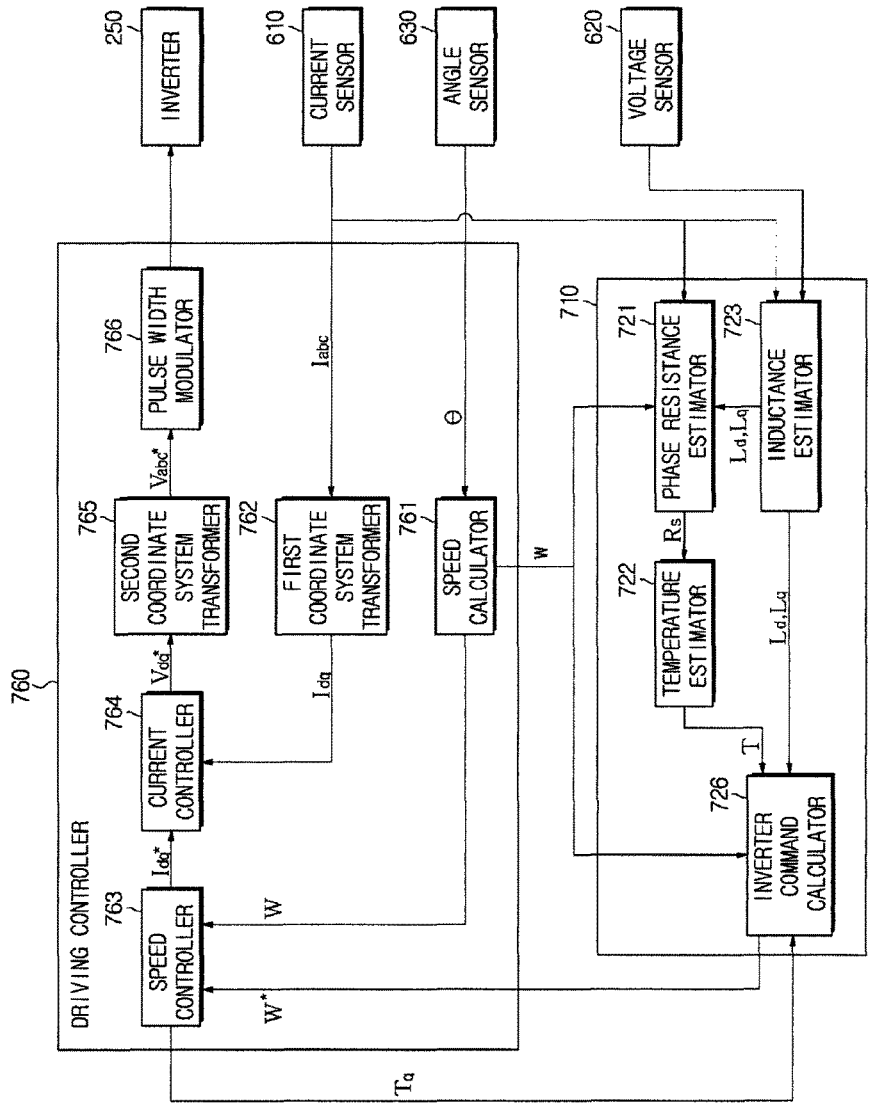
FIG. 19 is a detailed block diagram of the controller.

FIG. 18 is a block diagram illustrating a drive unit, a sensing unit, a storage, and a controller of a motor driving apparatus. FIG. 19 is a detailed block diagram of the controller.

The current sensor 610 may sense a driving current supplied to the motor 100, the voltage sensor 620 may sense a DC voltage supplied to the inverter 250, the angle sensor 630 may sense a rotational displacement of the motor 100, and the sensed driving current, DC voltage, and rotational displacement may be transmitted to the main controller 710 and the driving controller 760.

The speed calculator 761 of the driving controller 760 may calculate a rotational speed of the motor 100 based on the rotational displacement of the motor 100 sensed by the angle sensor 630 and the switching frequency determined by the pulse width modulator 766 and transmit the calculated rotational speed to the speed controller 763 and the main controller 710.

The main controller 710 may estimate a temperature and an inductance of the motor 100 by receiving the driving current and the DC voltage respectively sensed by the current sensor 610 and the voltage sensor 620.

Particularly, the phase resistance estimator 721 may estimate a phase resistance based on the driving current, the rotational speed, and the inductance, and the temperature estimator 722 may estimate a temperature of the motor 100 based on the estimated phase resistance.

The inductance estimator 723 may calculate a d-axis inductance and a q-axis inductance based on the sensed driving current and DC voltage. For example, the inductance estimator 723 may calculate the d-axis inductance and the q-axis inductance using a voltage equation by supplying a test voltage to the motor 100. Also, the inductance estimator 723 may calculate the d-axis inductance and the q-axis inductance by searching for data corresponding to the driving current sensed by the current sensor 610 and the DC voltage sensed by the voltage sensor 620 by retrieving the pre-stored parameters 590 from the storage 500. In addition, various other methods may also be used to estimate the d-axis inductance and the q-axis inductance.

The inverter command calculator 726 may calculate an inverter command or a speed command based on the temperature of the motor 100 estimated by the temperature estimator 722, the d-axis inductance and the q-axis inductance estimated by the inductance estimator 723, the rotational speed of the motor 100 calculated by the speed calculator 761, and the torque of the motor 100 calculated during controlling of the torque by the speed controller 763 and transmit the calculated command to the inverter 250 or the speed controller 763.

The inverter 250 may compensate for the copper loss and the iron loss of the motor 100 by adjusting the driving current based on a control signal received from the inverter command calculator 726 or the main controller 710.

Hereinafter, a motor driving apparatus that calculates a rotational speed by sensing a rotational displacement of a motor by using an angle sensor according to a fifth exemplary embodiment different from the second exemplary embodiment in which the speed is calculated in a sensorless manner without using the angle sensor will be described.

Figure 20:
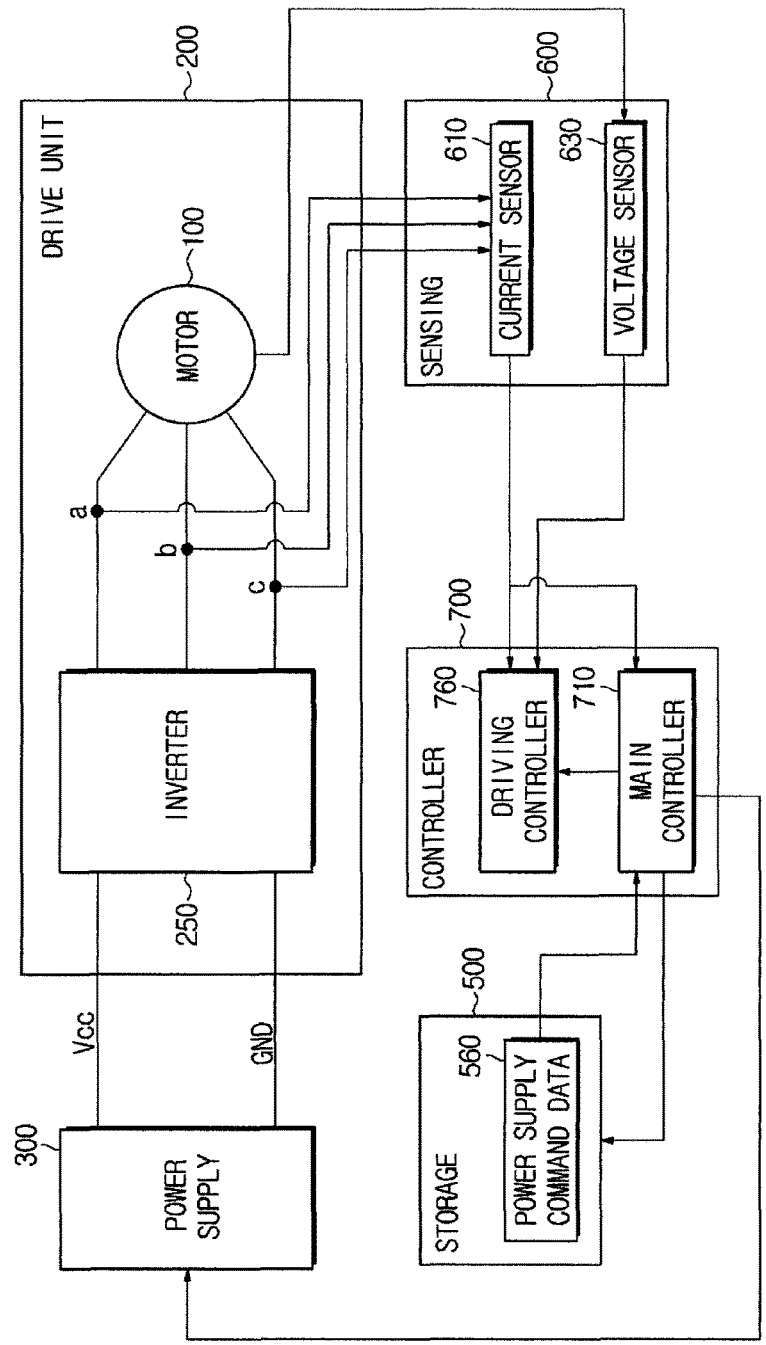
FIG. 20 is a block diagram illustrating a drive unit, a sensing unit, a storage, and a controller of a motor driving apparatus.
Figure 21:
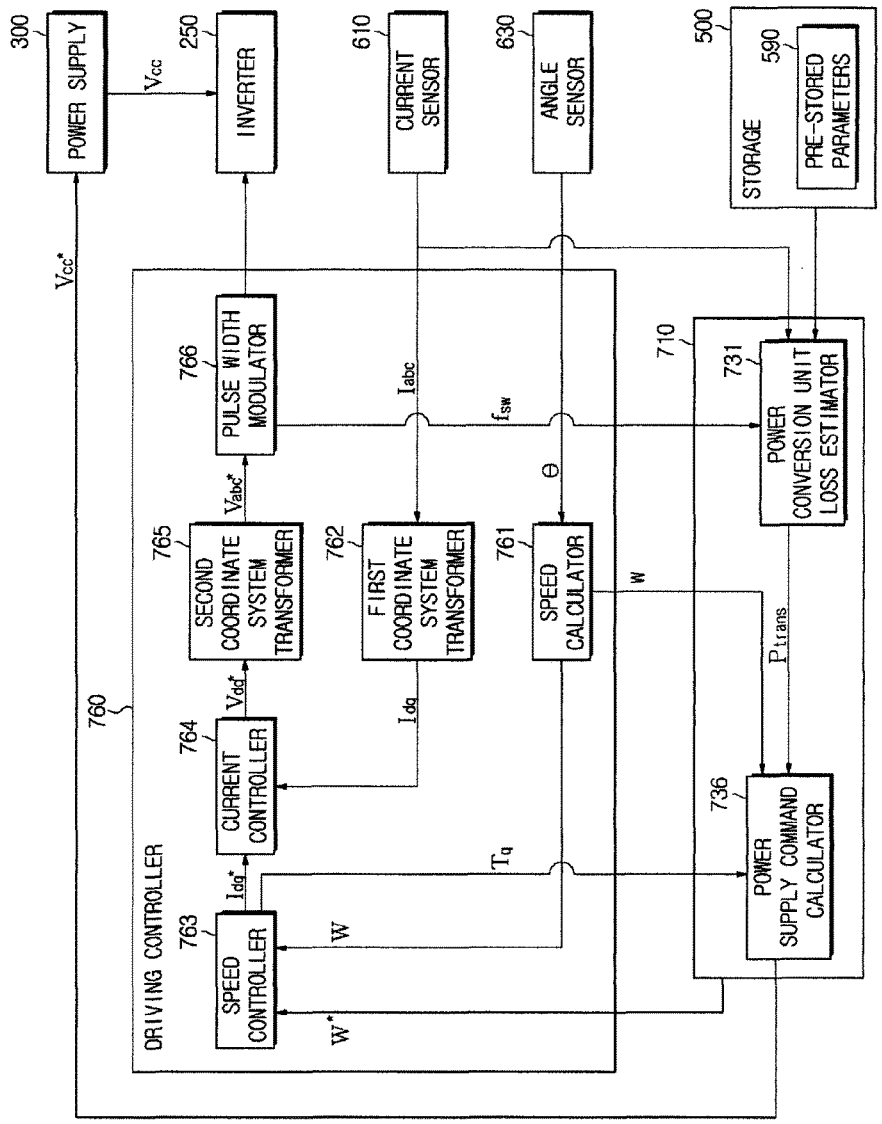
FIG. 21 is a detailed block diagram of the controller.

FIG. 20 is a block diagram illustrating a drive unit, a sensing unit, a storage, and a controller of a motor driving apparatus. FIG. 21 is a detailed block diagram of the controller.

The current sensor 610 may sense a driving current supplied to the motor 100, the voltage sensor 620 may sense a DC voltage supplied to the inverter 250, the angle sensor 630 may sense a rotational displacement of the motor 100, and the sensed driving current, DC voltage, and rotational displacement may be transmitted to the main controller 710 and the driving controller 760.

The speed calculator 761 of the driving controller 760 may calculate a rotational speed of the motor 100 based on the rotational displacement of the motor 100 sensed by the angle sensor 630 and the switching frequency determined by the pulse width modulator 766 and transmit the calculated rotational speed to the speed controller 763 and the main controller 710.

The main controller 710 may estimate a loss of the power conversion unit by receiving the driving current and the DC voltage respectively sensed by the current sensor 610 and the voltage sensor 620.

Particularly, the power conversion unit loss estimator 731 may estimate the loss of the power conversion unit based on the driving current sensed by the current sensor 610, the switching frequency determined by the pulse width modulator 766, and the data sheet of the power conversion unit among the parameters 590 pre-stored in the storage 500.

The power supply command calculator 736 may calculate a DC voltage command based on the loss of the power conversion unit estimated by the power conversion unit loss estimator 731, the rotational speed of the motor 100 calculated by the speed calculator 761, and the torque of the motor 100 calculated during controlling of the torque by the speed controller 763 and transmit the calculated DC voltage command to the power supply 300.

The power supply 300 may compensate for the loss of the power conversion unit such as the inverter 250 and the power supply 300 by adjusting the DC voltage based on the DC voltage command as a control signal received from the power supply command calculator 736.

Hereinafter, a motor driving apparatus that calculates a rotational speed by sensing a rotational displacement of a motor by using an angle sensor according to a sixth exemplary embodiment different from the third exemplary embodiment in which the speed is calculated in a sensorless manner without using the angle sensor will be described.

Figure 22:
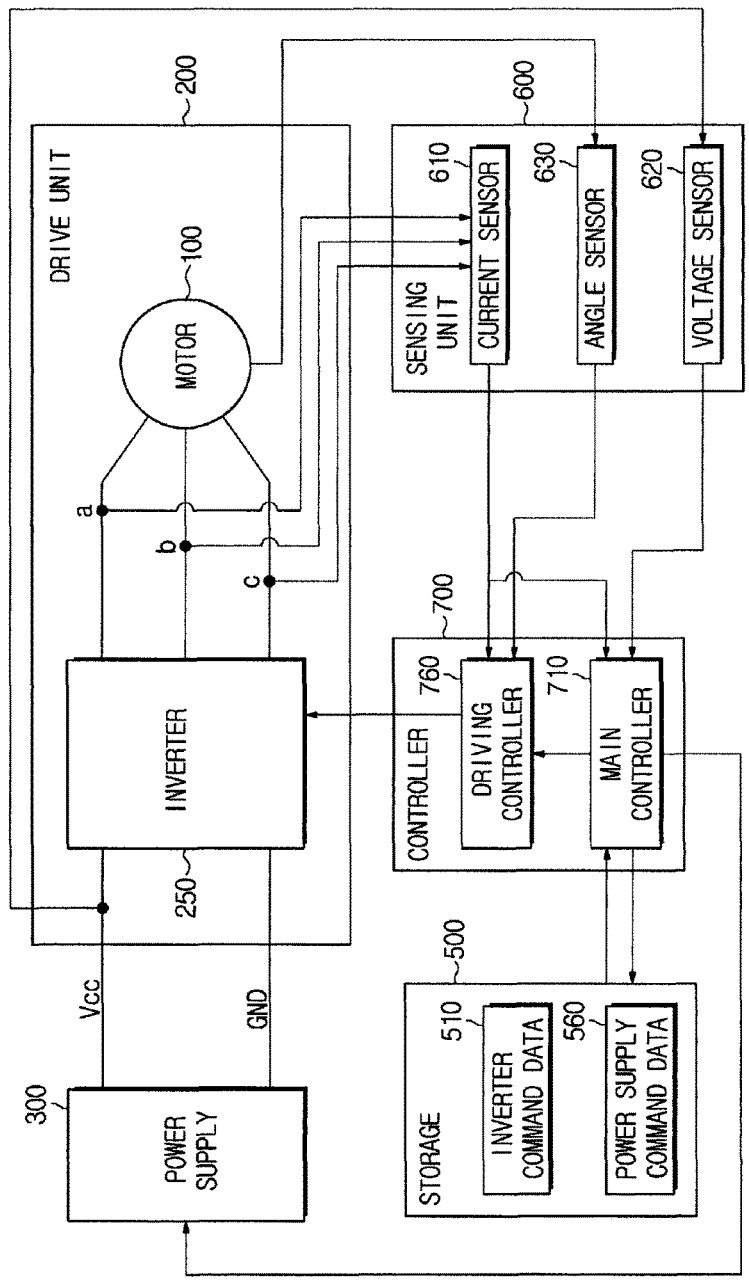
FIG. 22 is a block diagram illustrating a drive unit, a sensing unit, a storage, and a controller of a motor driving apparatus.
Figure 23:
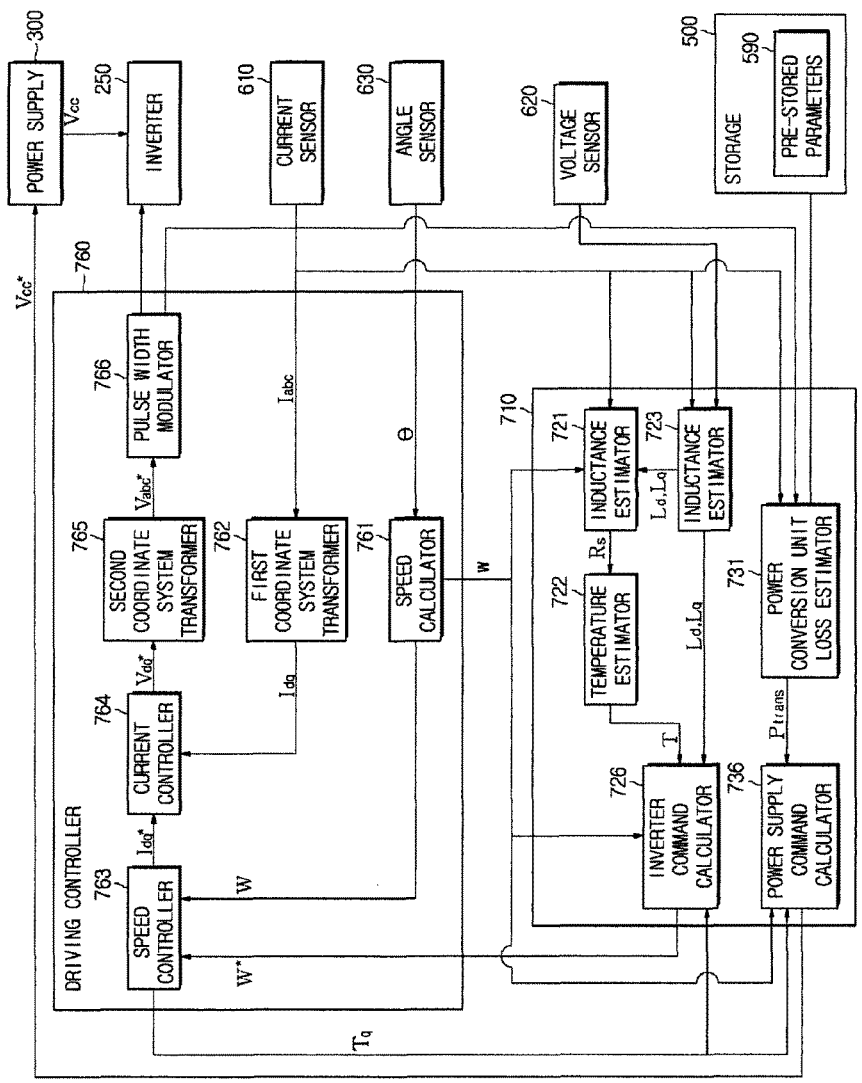
FIG. 23 is a detailed block diagram of the controller.

FIG. 22 is a block diagram illustrating a drive unit, a sensing unit, a storage, and a controller of a motor driving apparatus. FIG. 23 is a detailed block diagram of the controller.

The current sensor 610 may sense a driving current supplied to the motor 100, the voltage sensor 620 may sense a DC voltage supplied to the inverter 250, the angle sensor 630 may sense a rotational displacement of the motor 100, and the sensed driving current, DC voltage, and rotational displacement may be transmitted to the main controller 710 and the driving controller 760.

The speed calculator 761 of the driving controller 760 may calculate a rotational speed of the motor 100 based on the rotational displacement of the motor 100 sensed by the angle sensor 630 and the switching frequency determined by the pulse width modulator 766 and transmit the calculated rotational speed to the speed controller 763 and the main controller 710.

The main controller 710 may estimate a temperature and an inductance of the motor 100 and a loss of the power conversion unit by receiving the driving current and the DC voltage respectively sensed by the current sensor 610 and the voltage sensor 620.

Particularly, the phase resistance estimator 721 may estimate a phase resistance based on the driving current, the rotational speed, and the inductance, and the temperature estimator 722 may estimate a temperature of the motor 100 based on the estimated phase resistance. However, the temperature may also be estimated without using the phase resistance. The counter-electromotive force constant estimator 724 may estimate a counter-electromotive force constant based on the driving current, the rotational speed, and the inductance and the temperature estimator 722 may estimate a temperature of the motor 100 based on the estimated counter-electromotive force constant.

The inductance estimator 723 may calculate a d-axis inductance and a q-axis inductance based on the sensed driving current and DC voltage. For example, the inductance estimator 723 may calculate the d-axis inductance and the q-axis inductance using a voltage equation by supplying a test voltage to the motor 100. Also, the inductance estimator 723 may calculate the d-axis inductance and the q-axis inductance by searching for data corresponding to the driving current sensed by the current sensor 610 and the DC voltage sensed by the voltage sensor 620 by retrieving the pre-stored parameters 590 from the storage 500. In addition, various other methods may also be used to estimate the d-axis inductance and the q-axis inductance.

The power conversion unit loss estimator 731 may estimate a loss of the power conversion unit based on the driving current sensed by the current sensor 610, the switching frequency determined by the pulse width modulator 766, and the data sheet of the power conversion unit among the parameters 590 pre-stored in the storage 500.

The inverter command calculator 726 may calculate an inverter command or a speed command based on the temperature of the motor 100 estimated by the temperature estimator 722, the d-axis inductance and the q-axis inductance estimated by the inductance estimator 723, the rotational speed of the motor 100 calculated by the speed calculator 761, and the torque of the motor 100 calculated during controlling of the torque by the speed controller 763 and transmit the calculated command to the inverter 250 or the speed controller 763. In addition, the power supply command calculator 736 may calculate a DC voltage command based on the loss of the power conversion unit estimated by the power conversion unit loss estimator 731, the rotational speed of the motor 100 calculated by the speed calculator 761, and the torque of the motor 100 calculated during controlling of the torque by the speed controller 763 and transmit the calculated DC voltage command to the power supply 300.

The inverter 250 may compensate for the copper loss and the iron loss of the motor 100 by adjusting the driving current based on a control signal received from the inverter command calculator 726 or the main controller 710. Also, the power supply 300 may compensate for the loss of the power conversion unit such as the inverter 250 and the power supply 300 by adjusting the DC voltage based on the DC voltage command as a control signal received from the power supply command calculator 736.

Hereinafter, a motor driving apparatus in which a temperature sensor directly senses a temperature of a motor according to a seventh exemplary embodiment different from the first exemplary embodiment in which the temperature is estimated based on the estimated phase resistance and counter-electromotive force constant will be described.

Figure 24:
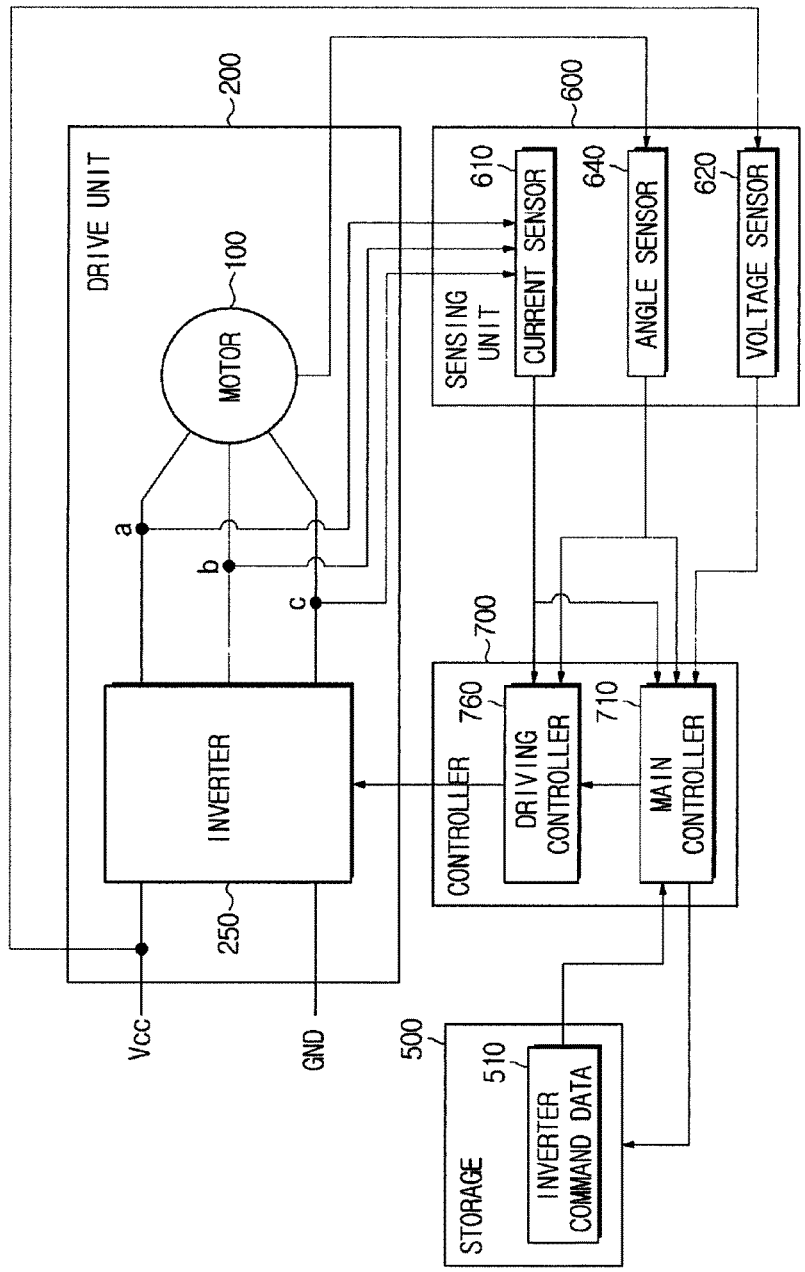
FIG. 24 is a block diagram illustrating a drive unit, a sensing unit, a storage, and a controller of a motor driving apparatus.
Figure 25:
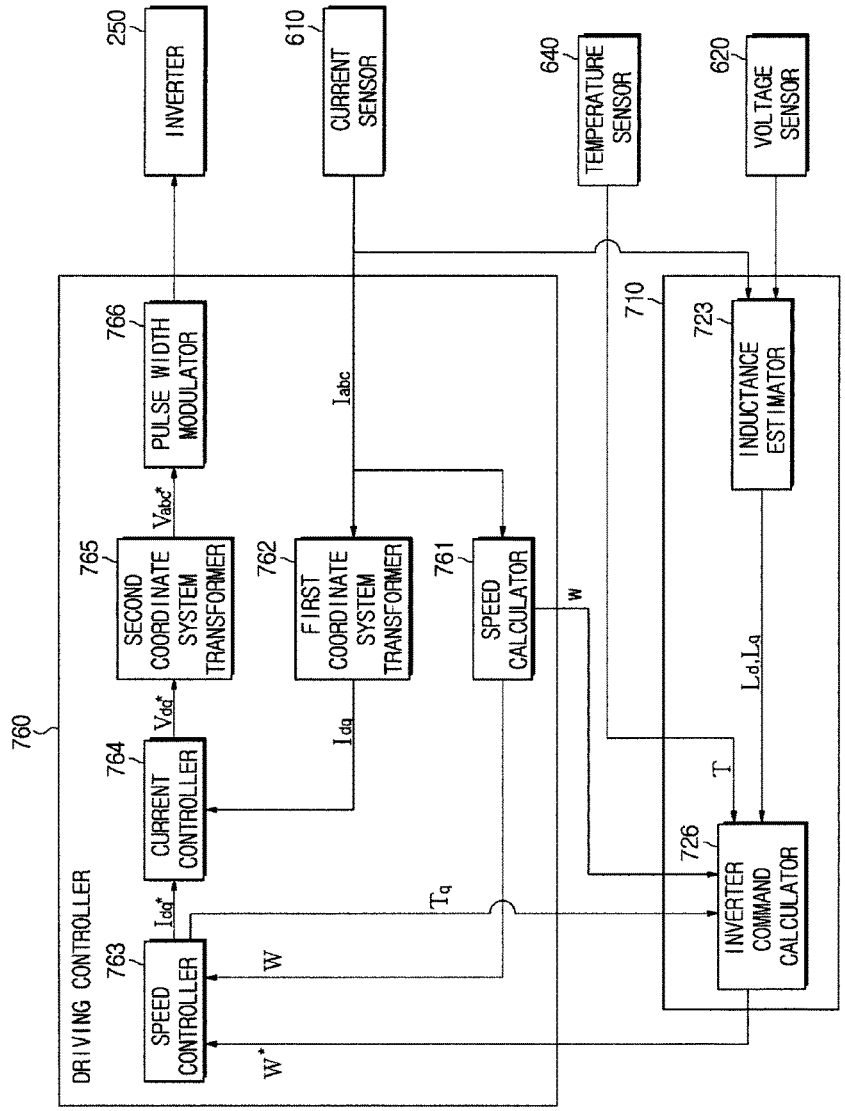
FIG. 25 is a detailed block diagram of the controller.

FIG. 24 is a block diagram illustrating a drive unit, a sensing unit, a storage, and a controller of a motor driving apparatus. FIG. 25 is a detailed block diagram of the controller.

The current sensor 610 may sense a driving current supplied to the motor 100, the voltage sensor 620 may sense a DC voltage supplied to the inverter 250, and the sensed driving current and DC voltage may be transmitted to the main controller 710 and the driving controller 760.

The temperature sensor 640 may sense a temperature of the motor 100 and transmit the sensed temperature to the main controller 710. The temperature sensor 640 may directly sense the temperature of the motor 100 instead of the phase resistance estimator, the counter-electromotive force constant estimator, and the temperature estimator according to the first exemplary embodiment or the fourth exemplary embodiment and transmit the sensed temperature to the inverter command calculator. The inverter command calculator may use the received temperature to calculate an inverter command or a speed command.

In addition, the temperature sensor 640 may sense a temperature of the motor 100 by sensing an electrical resistance change, by sensing a thermal electromotive force, based on temperature characteristics of a silicon diode or transistor, or based on a pyroelectric phenomenon.

Particularly, according to the method of measuring temperature of the motor 100 by sensing an electrical resistance change, a resistance temperature detector (RTD) may be used. A thermistor that senses temperature based on characteristics of a semiconductor whose resistance changes in accordance with temperature may be used. In thermistors, a negative temperature coefficient (NTC), a positive temperature coefficient (PTC), and a critical temperature resistor (CTR) may be used.

In addition, when the temperature sensor 640 senses a temperature of the motor 100 by using a thermal electromotive force, a thermocouple element that senses a temperature of the motor 100 by using two different metal wires may be used.

In addition, various other temperature sensors may be used as the temperature sensor 640 to measure the temperature of the motor 100.

The main controller 710 may estimate an inductance of the motor 100 by receiving the driving current and the DC voltage respectively sensed by the current sensor 610 and the voltage sensor 620.

Particularly, the inductance estimator 723 may calculate a d-axis inductance and a q-axis inductance based on the sensed driving current and DC voltage. For example, the inductance estimator 723 may calculate the d-axis inductance and the q-axis inductance using a voltage equation by supplying a test voltage to the motor 100. Also, the inductance estimator 723 may calculate the d-axis inductance and the q-axis inductance by searching for data corresponding to the driving current sensed by the current sensor 610 and the DC voltage sensed by the voltage sensor 620 by retrieving the pre-stored parameters 590 from the storage 500. In addition, various other methods may also be used to estimate the d-axis inductance and the q-axis inductance The inverter command calculator 726 may calculate an inverter command or a speed command based on the temperature of the motor 100 sensed by the temperature sensor 640, the d-axis inductance and the q-axis inductance estimated by the inductance estimator 723, the rotational speed of the motor 100 calculated by the speed calculator 761, and the torque of the motor 100 calculated during controlling of the torque by the speed controller 763 and transmit the calculated command to the inverter 250 or the speed controller 763. The inverter 250 may compensate for the copper loss and the iron loss of the motor 100 by adjusting the driving current based on a control signal received from the inverter command calculator 726 or the main controller 710.

Hereinafter, a motor driving apparatus in which a temperature sensor directly senses a temperature of a motor according to an eighth exemplary embodiment different from the third exemplary embodiment in which the temperature is estimated based on the estimated phase resistance or the counter-electromotive force constant will be described.

Figure 26:
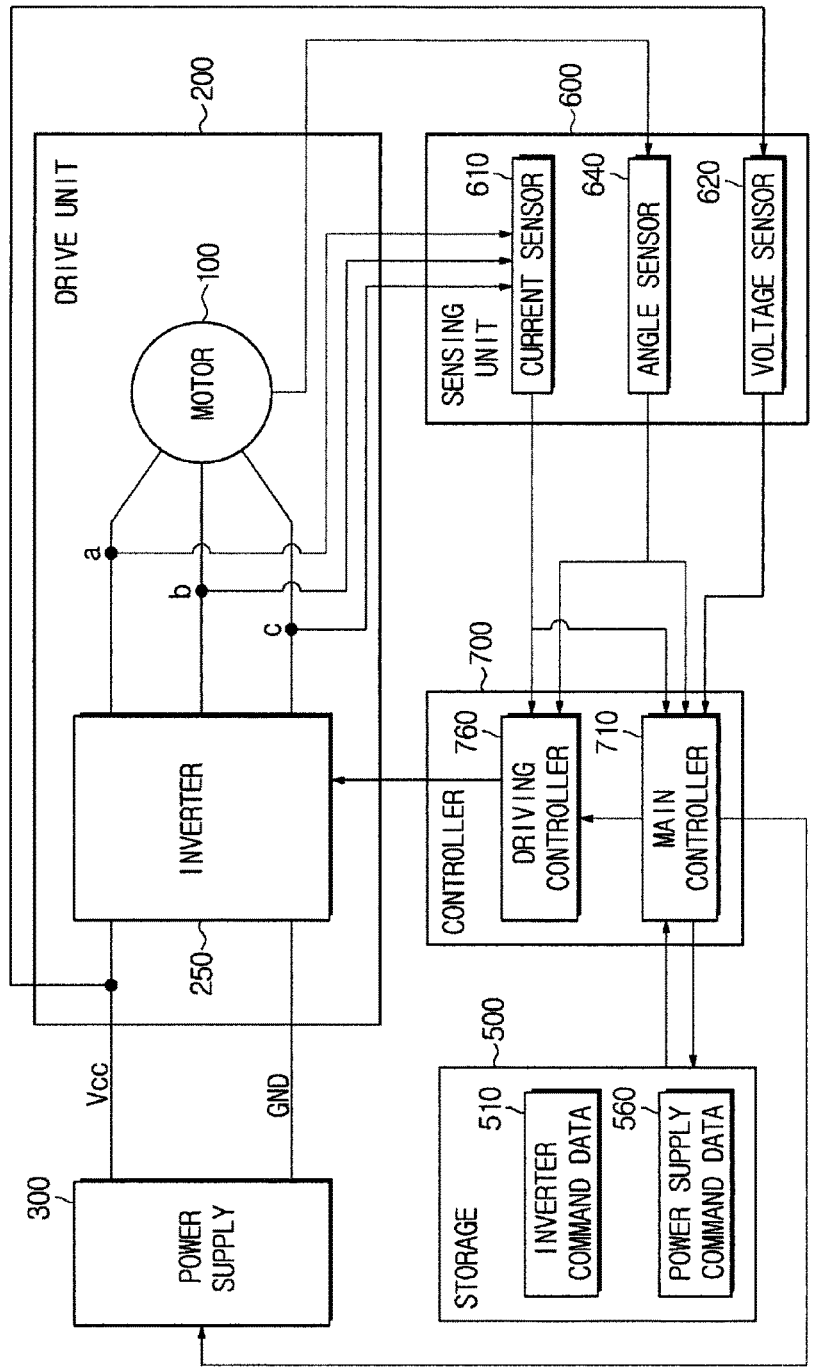
FIG. 26 is a block diagram illustrating a drive unit, a sensing unit, a storage, and a controller of a motor driving apparatus.
Figure 27:
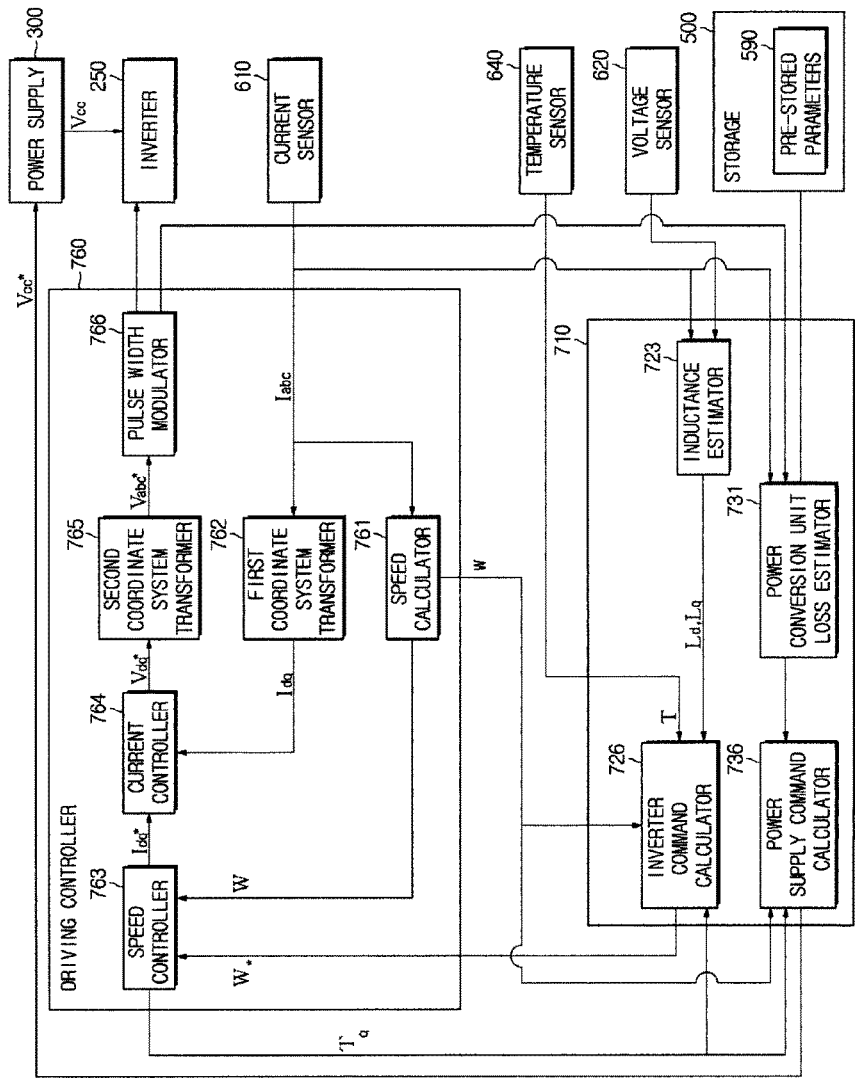
FIG. 27 is a detailed block diagram of the controller.

FIG. 26 is a block diagram illustrating a drive unit, a sensing unit, a storage, and a controller of a motor driving apparatus. FIG. 27 is a detailed block diagram of the controller.

The current sensor 610 may sense a driving current supplied to the motor 100, the voltage sensor 620 may sense a DC voltage supplied to the inverter 250, and the sensed driving current and DC voltage may be transmitted to the main controller 710 and the driving controller 760.

The temperature sensor 640 may sense a temperature of the motor 100 and transmit the sensed temperature to the main controller 710. The temperature sensor 640 may directly sense the temperature of the motor 100 instead of using the phase resistance estimator, the counter-electromotive force constant estimator, and the temperature estimator according to the first exemplary embodiment or the fourth exemplary embodiment and transmit the sensed temperature to the inverter command calculator. The inverter command calculator may use the received temperature to calculate an inverter command or a speed command.

The main controller 710 may estimate an inductance of the motor 100 and a loss of the power conversion unit by receiving the driving current and the DC voltage respectively sensed by the current sensor 610 and the voltage sensor 620.

The inductance estimator 723 may calculate a d-axis inductance and a q-axis inductance based on the sensed driving current and DC voltage. For example, the inductance estimator 723 may calculate the d-axis inductance and the q-axis inductance using a voltage equation by supplying a test voltage to the motor 100. Also, the inductance estimator 723 may calculate the d-axis inductance and the q-axis inductance by searching for data corresponding to the driving current sensed by the current sensor 610 and the DC voltage sensed by the voltage sensor 620 by retrieving the pre-stored parameters 590 from the storage 500. In addition, various other methods may also be used to estimate the d-axis inductance and the q-axis inductance.

The power conversion unit loss estimator 731 may estimate a loss of the power conversion unit based on the sensed driving current, the switching frequency determined by the pulse width modulator 766, and the data sheet of the power conversion unit among the parameters 590 pre-stored in the storage 500.

The inverter command calculator 726 may calculate an inverter command or a speed command based on the temperature of the motor 100 sensed by the temperature sensor 640, the d-axis inductance and the q-axis inductance estimated by the inductance estimator 723, the rotational speed of the motor 100 calculated by the speed calculator 761, and the torque of the motor 100 calculated during controlling of the torque by the speed controller 763 and transmit the calculated command to the inverter 250 or the speed controller 763. In addition, the power supply command calculator 736 may calculate a DC voltage command based on the loss of the power conversion unit estimated by the power conversion unit loss estimator 731, the rotational speed of the motor 100 calculated by the speed calculator 761, and the torque of the motor 100 calculated during controlling of the torque by the speed controller 763 and transmit the calculated DC voltage command to the power supply 300.

The inverter 250 may compensate for the copper loss and the iron loss of the motor 100 by adjusting the driving current based on a control signal received from the inverter command calculator 726 or the main controller 710. Also, the power supply 300 may compensate for the loss of the power conversion unit such as the inverter 250 and the power supply 300 by adjusting the DC voltage based on the DC voltage command as a control signal received from the power supply command calculator 736.

The configuration of the motor driving apparatus has been described above. Hereinafter, a method of compensating for a loss of a motor driving apparatus will be described with reference to FIGS. 28 to 30.

Figure 28:
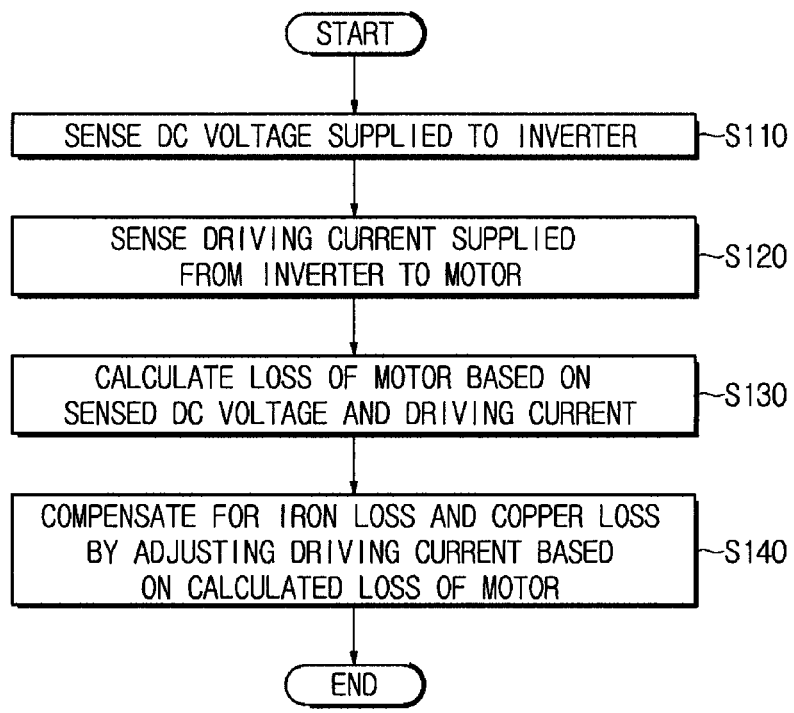
FIG. 28 is a flowchart illustrating a method of compensating for a loss of a motor driving apparatus according to an embodiment.

FIG. 28 is a flowchart illustrating a method of compensating for a loss of a motor driving apparatus according to an embodiment.

First, a voltage sensor senses a DC voltage supplied from a power supply to an inverter (110), a current sensor senses a driving current supplied from the inverter to a motor (120), and the sensed DC voltage and driving current are transmitted to a driving controller and a main controller.

The main controller calculates a loss of the motor based on the DC voltage and the driving current received from the voltage sensor and the current sensor (130). In addition, the main controller transmits an inverter command or a speed command to the inverter or the driving controller based on the calculated loss of the motor, and the inverter or the driving controller compensates for an iron loss and a copper loss of the motor by adjusting the driving current (140).

Figure 29:
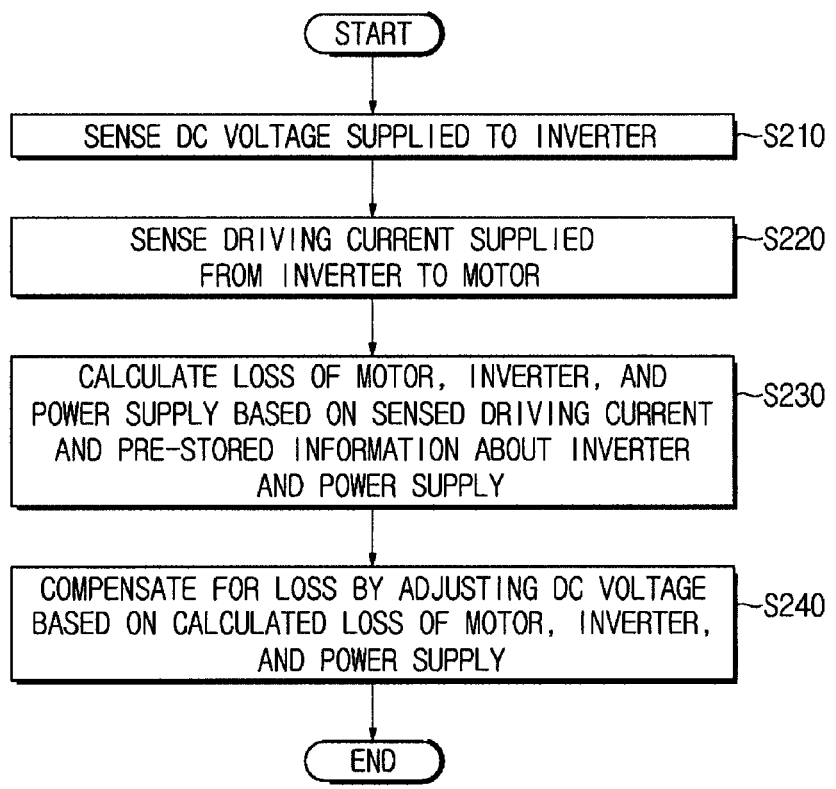
FIG. 29 is a flowchart illustrating a method of compensating for a loss of a motor driving apparatus according to another embodiment.

FIG. 29 is a flowchart illustrating a method of compensating for a loss of a motor driving apparatus according to another embodiment.

First, a voltage sensor senses a DC voltage supplied from a power supply to an inverter (210), a current sensor senses a driving current supplied from the inverter to a motor (220), and the sensed DC voltage and driving current are transmitted to a driving controller and a main controller.

The main controller calculates losses of the motor, the inverter, and the power supply based on the driving current received from the current sensor and information about the inverter and the power supply pre-stored in the storage (230). In addition, the main controller compensates for the losses of the inverter and the power supply by controlling the power supply to adjust a DC voltage by calculating a DC voltage command based on the losses of the motor, the inverter, and the power supply and transmitting the calculated DC voltage command to the power supply (240).

FIG. 30 is a flowchart illustrating a method of compensating for a loss of a motor driving apparatus according to another embodiment.

First, a voltage sensor senses a DC voltage supplied from a power supply to an inverter (310), a current sensor senses a driving current supplied from the inverter to a motor (320), and the sensed DC voltage and driving current are transmitted to a driving controller and a main controller.

The main controller calculates a loss of the motor based on the DC voltage and the driving current received from the voltage sensor and the current sensor. Also, the main controller calculates losses of the inverter and the power supply based on the driving current received from the current sensor and information about the inverter and the power supply pre-stored in a storage (330).

As the main controller transmits an inverter command or a speed command calculated based the calculated loss of the motor to the inverter or the driving controller and the inverter or driving controller adjusts the driving current, the iron loss and the copper loss of the motor are compensated for (340). In addition, the main controller compensates for the losses of the inverter and the power supply by controlling the power supply to adjust a DC voltage by transmitting a DC voltage command calculated based on the calculated losses of the motor, the inverter, and the power supply to the power supply (350).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A motor driving apparatus comprising:
an inverter configured to supply driving power to a motor;
a sensing unit configured to sense a DC voltage supplied to the inverter and a driving current supplied from the inverter to the motor; and
a controller configured to determine a loss of the motor based on the sensed DC voltage and driving current and control the inverter to adjust the driving current based on the determined loss of the motor,
wherein the controller is further configured to determine a temperature, an inductance, a torque, and a rotational speed of the motor based on the sensed DC voltage and driving current and control the inverter to adjust the driving current based on the determined temperature, inductance, torque, and rotational speed.

2. The motor driving apparatus according to claim 1, wherein the controller controls the inverter to adjust the driving current based on an inverter command formula.

3. The motor driving apparatus according to claim 1, wherein the controller controls the inverter to adjust the driving current based on an inverter command data table.

4. The motor driving apparatus according to claim 1, wherein the sensing unit senses a rotational displacement of the motor, and
the controller determines the rotational speed based on the sensed rotational displacement.

5. The motor driving apparatus according to claim 1, wherein the controller determines a phase resistance to determine the temperature of the motor and determines the temperature based on the determined phase resistance.

6. The motor driving apparatus according to claim 1, wherein the controller determines a counter-electromotive force constant to determine the temperature of the motor and determines the temperature based on the determined counter-electromotive force constant.

7. The motor driving apparatus according to claim 1, wherein the sensing unit senses a temperature of the motor, and
the controller determines the temperature based on the sensed temperature to control the inverter.

8. The motor driving apparatus according to claim 1, wherein the controller determines the inductance using pre-stored parameters.

9. A method of controlling a motor driving apparatus, the method comprising:
performing, by at least one processor of the motor driving apparatus, operations including:
sensing a DC voltage supplied to an inverter and a driving current supplied from the inverter to a motor;
determining a loss of the motor based on the sensed DC voltage and driving current;
adjusting the driving current based on the determined loss of the motor;
determining a temperature, an inductance, a torque, and a rotational speed of the motor based on the sensed DC voltage and driving current; and
adjusting the driving current based on the determined temperature, inductance, torque, and rotational speed.

10. The method according to claim 9, further comprising adjusting the driving current based on an inverter command formula.

11. The method according to claim 9, further comprising adjusting the driving current based on an inverter command data table.

12. The method according to claim 9, further comprising sensing a rotational displacement of the motor,
wherein the determination of the rotational speed is performed based on the sensed rotational displacement.

13. The method according to claim 9, wherein the determination of the temperature of the motor is performed by determining a phase resistance and determining the temperature based on the determined phase resistance.

14. The method according to claim 9, wherein the determination of the temperature of the motor is performed by determining a counter-electromotive force constant and determining the temperature based on the determined counter-electromotive force constant.

15. The method according to claim 9, further comprising sensing a temperature of the motor, and
determining the temperature using the sensed temperature of the motor.

16. The method according to claim 9, wherein the inductance is determined using pre-stored parameters.

* * * * *